US012770451B2

(12) United States Patent
Rule et al.

(10) Patent No.: US 12,770,451 B2
(45) Date of Patent: Oct. 20, 2026

(54) CONTACTLESS CARD AND PERSONAL IDENTIFICATION SYSTEM

(71) Applicant: Capital One Services, LLC, McLean, VA (US)

(72) Inventors: Jeffrey Rule, Chevy Chase, MD (US); Srinivasa Chigurupati, Long Grove, IL (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/234,409

(22) Filed: Jun. 11, 2025

(65) Prior Publication Data

US 2025/0308316 A1 Oct. 2, 2025

Related U.S. Application Data

(63) Continuation-in-part of application No. 19/066,317, filed on Feb. 28, 2025, which is a continuation of (Continued)

(51) Int. Cl.

| | |
|---|---|
| ***G07F 7/10*** | (2006.01) |
| ***G06K 19/07*** | (2006.01) |
| ***G06K 19/077*** | (2006.01) |

(52) U.S. Cl.

CPC ....... *G07F 7/1008* (2013.01); *G06K 19/0723* (2013.01); *G06K 19/07749* (2013.01)

(58) Field of Classification Search

CPC .............. G07F 7/1008; G06K 19/0723; G06K 19/07749

(Continued)

(56) References Cited

U.S. PATENT DOCUMENTS

| | | | |
|---|---|---|---|
| 5,590,038 | A | 12/1996 | Pitroda |
| 5,666,415 | A | 9/1997 | Kaufman |

(Continued)

FOREIGN PATENT DOCUMENTS

| | | | |
|---|---|---|---|
| CN | 101192295 | A | 6/2008 |
| CN | 104113411 | A | 10/2014 |

(Continued)

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

(Continued)

*Primary Examiner* — Ahshik Kim
(74) *Attorney, Agent, or Firm* — KDW Firm, PLLC

(57) ABSTRACT

For multifactor authentication, a transaction device can receive encrypted data from a contactless card within a communication range of a short-range communication antenna, communicate the encrypted data to an authenticating device, solicit a user PIN in response to authentication of the encrypted data by the authenticating device, receive an input PIN, communicate the input PIN to a separate device storing a record PIN for the contactless card, and authorize a transaction initiated in connection with the contactless card in response to matching of the input PIN with the record PIN by the separate device. The input PIN can be received from the contactless card itself or a user interface, and the separate device can include the authenticating device or the contactless card itself. In different embodiments, the input PIN or the record PIN can include (Continued)

an EMV PIN stored in an EMV applet on the contactless card.

20 Claims, 29 Drawing Sheets

Related U.S. Application Data application No. 18/232,493, filed on Aug. 10, 2023, now Pat. No. 12,300,075, which is a continuation of application No. 18/082,890, filed on Dec. 16, 2022, now Pat. No. 11,776,348, which is a continuation of application No. 17/377,189, filed on Jul. 15, 2021, now Pat. No. 11,557,164, which is a continuation of application No. 16/826,522, filed on Mar. 23, 2020, now Pat. No. 11,080,961, which is a continuation of application No. 16/725,133, filed on Dec. 23, 2019, now Pat. No. 10,657,754.

(58) Field of Classification Search
USPC .......................................................... 235/380
See application file for complete search history.

(56) References Cited

U.S. PATENT DOCUMENTS 6,199,114 B1 3/2001 White
6,324,271 B1 11/2001 Sawyer
6,367,011 B1 4/2002 Lee
6,572,015 B1 6/2003 Norton
7,252,242 B2 8/2007 Ho
7,270,276 B2 9/2007 Vayssiere
7,287,692 B1 10/2007 Patel
7,374,099 B2 5/2008 de Jong
7,527,208 B2 5/2009 Hammad
7,568,631 B2 8/2009 Gibbs
7,584,153 B2 9/2009 Brown
7,628,322 B2 12/2009 Holtmanns
7,793,851 B2 9/2010 Mullen
7,801,799 B1 9/2010 Brake, Jr.
7,908,216 B1 3/2011 Davis
7,922,082 B2 4/2011 Muscato
8,010,405 B1 8/2011 Bortolin
8,074,877 B2 12/2011 Mullen
8,082,450 B2 12/2011 Frey
8,108,687 B2 1/2012 Ellis
8,186,602 B2 5/2012 Itay
8,196,131 B1 6/2012 von Behren
8,249,654 B1 8/2012 Zhu
8,276,814 B1 10/2012 Davis
8,332,272 B2 12/2012 Fisher
8,346,670 B2 1/2013 Hasson
8,511,547 B2 8/2013 Rans
8,519,822 B2 8/2013 Riegebauer
8,750,514 B2 6/2014 Gallo
8,870,081 B2 10/2014 Olson
9,038,893 B2 5/2015 Kirkham
9,129,199 B2 9/2015 Spodak
9,183,490 B2 11/2015 Moreton
9,275,325 B2 3/2016 Newcombe
9,286,606 B2 3/2016 Diamond
9,306,753 B1 4/2016 Vandervort
9,485,092 B2 * 11/2016 Smets .................. H04L 9/0841
9,501,776 B2 11/2016 Martin
9,710,744 B2 7/2017 Wurmfeld
9,949,065 B1 4/2018 Zarakas
9,965,632 B2 5/2018 Zarakas
9,965,911 B2 5/2018 Wishne
9,977,890 B2 5/2018 Alberti
9,978,056 B2 5/2018 Seo
9,978,058 B2 5/2018 Wurmfeld
9,990,795 B2 6/2018 Wurmfeld
10,007,873 B2 6/2018 Heo
10,013,693 B2 7/2018 Wyatt
10,121,130 B2 11/2018 Pinski
10,210,505 B2 2/2019 Zarakas
10,242,368 B1 3/2019 Poole
10,296,910 B1 5/2019 Templeton
10,332,102 B2 6/2019 Zarakas
10,360,557 B2 7/2019 Locke
10,380,471 B2 8/2019 Locke
10,395,244 B1 8/2019 Mossler
10,453,054 B2 10/2019 Zarakas
10,474,941 B2 11/2019 Wurmfeld
10,475,027 B2 11/2019 Guise
10,482,453 B2 11/2019 Zarakas
10,482,457 B2 11/2019 Poole
10,489,774 B2 11/2019 Zarakas
10,489,781 B1 11/2019 Osborn
10,510,070 B2 12/2019 Wurmfeld
10,515,361 B2 12/2019 Zarakas
10,535,068 B2 1/2020 Locke
10,546,444 B2 1/2020 Osborn
10,581,611 B1 3/2020 Osborn
10,664,830 B1 5/2020 Rule
10,685,349 B2 6/2020 Brickell
10,797,882 B2 10/2020 Rule
10,880,741 B2 12/2020 Zarakas
10,909,525 B1 2/2021 Dhodapkar
10,970,691 B2 4/2021 Koeppel
10,984,416 B2 4/2021 Ilincic
11,037,136 B2 6/2021 Rule
11,062,098 B1 7/2021 Bergeron
11,080,961 B2 8/2021 Osborn et al.
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler
11,297,958 B2 4/2022 Vukich
11,334,872 B2 5/2022 Phillips
11,361,173 B2 6/2022 Edwards
11,392,933 B2 7/2022 Mossler
11,392,935 B2 7/2022 Suresh
11,416,844 B1 8/2022 Osterkamp
11,423,392 B1 8/2022 Ho
11,443,292 B2 9/2022 Sherif
11,444,770 B2 9/2022 Wieker
11,461,764 B2 10/2022 Rule
11,481,764 B2 10/2022 Shakkarwar
11,521,213 B2 12/2022 Rule
11,551,200 B1 1/2023 Cook
11,556,918 B2 1/2023 Mestre
11,615,395 B2 3/2023 McHugh
11,777,933 B2 10/2023 Moreton
2003/0220876 A1 11/2003 Burger
2005/0156026 A1 7/2005 Ghosh
2005/0228997 A1 10/2005 Bicker
2005/0269402 A1 12/2005 Spitzer
2007/0276765 A1 11/2007 Hazel
2008/0082452 A1 4/2008 Wankmueller
2008/0099552 A1 5/2008 Grillion
2009/0143104 A1 6/2009 Loh
2009/0235339 A1 9/2009 Mennes
2009/0282264 A1 11/2009 Amiel
2011/0113245 A1 5/2011 Varadarajan
2011/0155801 A1 6/2011 Rowberry
2012/0143703 A1 6/2012 Wall
2013/0030997 A1 1/2013 Spodak
2013/0146657 A1 6/2013 Graef
2013/0211937 A1 8/2013 Elbirt
2013/0311363 A1 11/2013 Ramaci
2014/0020073 A1 1/2014 Ronda
2014/0074637 A1 3/2014 Hammad
2014/0074655 A1 3/2014 Lim
2014/0081785 A1 3/2014 Valadas Preto
2014/0365377 A1 12/2014 Salama
2015/0032635 A1 1/2015 Guise
2015/0073983 A1 3/2015 Bartenstein
2015/0113271 A1 4/2015 Jooste
2015/0134513 A1 5/2015 Olson
2015/0199673 A1 7/2015 Savolainen

(56) References Cited

U.S. PATENT DOCUMENTS

| | | | |
|---|---|---|---|
| 2015/0199863 A1 | 7/2015 | Scoggins | |
| 2015/0254637 A1 | 9/2015 | Yang | |
| 2015/0317295 A1 | 11/2015 | Sherry | |
| 2016/0078430 A1 | 3/2016 | Douglas | |
| 2016/0189143 A1 | 6/2016 | Koeppel | |
| 2016/0253651 A1 | 9/2016 | Park | |
| 2016/0277383 A1 | 9/2016 | Guyomarc'h | |
| 2016/0307189 A1 | 10/2016 | Zarakas | |
| 2016/0314472 A1 | 10/2016 | Ashfield | |
| 2016/0379217 A1 | 12/2016 | Hammad | |
| 2017/0017957 A1 | 1/2017 | Radu | |
| 2017/0039566 A1 | 2/2017 | Schipperheijn | |
| 2017/0068950 A1 | 3/2017 | Kwon | |
| 2017/0277879 A1 * | 9/2017 | Taniguchi | H04L 63/08 |
| 2017/0330173 A1 | 11/2017 | Woo | |
| 2018/0039987 A1 | 2/2018 | Molino | |
| 2018/0268132 A1 | 9/2018 | Buer | |
| 2018/0300716 A1 | 10/2018 | Carlson | |
| 2019/0172055 A1 | 6/2019 | Hale | |
| 2019/0303945 A1 | 10/2019 | Mitra | |
| 2021/0004806 A1 | 1/2021 | Noe | |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | | |
|---|---|---|---|
| GB | 2516861 | A | 2/2015 |
| GB | 2551907 | A | 1/2018 |
| KR | 20150140132 | A | 12/2015 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2018096559 | A1 | 5/2018 |
| WO | 2018159024 | A1 | 9/2018 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Smart Card Alliance, "Card Payments Roadmap in the United States: How Will EMV Impact the Future Payments Infrastructure?", A Smart Card Alliance Payments Council White Paper, pp. 1-57, https://web.archive.org/web/20121021010658/http://www.smartcardalliance.org/resources/pdf/Payments_Roadmap_in_the_US_091512.pdf, Sep. 31, 2012.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

FIG. 1A
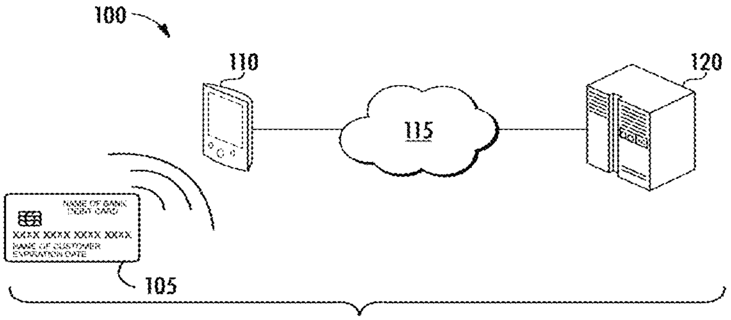
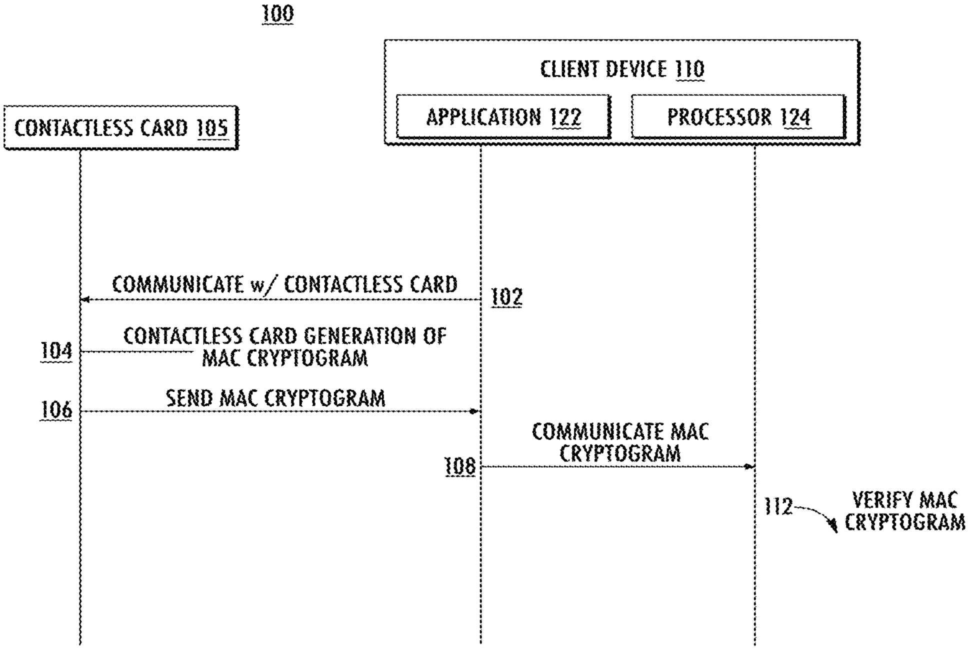
FIG. 1B

1600

| 1602 | 1604 | 1606 | 1608 | 1610 | 1612 | 1614 | 1616 |
|---|---|---|---|---|---|---|---|
| APP VER. | IDI | ISSUER ID | pKEY ID | pUID | pATC | NONCE | CRYPTOGRAM |

1618

| | 1620 | 1622 |
|---|---|---|
| 1602 | Major Version | Fixed in Software<br>2 bytes of ASCII HEX encoded 1 bytes binary data |
| 1604 | Issuer Discretionary Indicator | Set at Personalisation<br>2 bytes of ASCII HEX encoded 1 bytes binary data |
| 1606 | pIssuerID | Set at Personalisation<br>6 bytes of ASCII HEX encoded 3 bytes binary data |
| 1608 | pKeyID | Set at Personalisation<br>6 bytes of ASCII HEX encoded 3 bytes binary data |
| 1610 | pUID | Set at Personalisation<br>16 bytes of ASCII HEX encoded 8 bytes binary data |
| 1612 | pATC | Set at Personalisation and updated on each transaction<br>8 bytes of ASCII HEX encoded 4 bytes binary data |
| 1614 | Nonce | Value of the nonce used in enciphered cryptogram calculation<br>8 bytes of ASCII HEX encoded 4 bytes binary data |
| 1616 | Enciphered Cryptogram | 32 bytes of ASCII HEX encoded 16 bytes binary data |

FIG. 16

CONTACTLESS CARD AND PERSONAL IDENTIFICATION SYSTEM

CROSS-REFERENCE TO RELATED APPLICATIONS

This application is a continuation-in-part of U.S. application Ser. No. 19/066,317, filed Feb. 28, 2025, which is a continuation of U.S. application Ser. No. 18/232,493, filed Aug. 10, 2023 (now U.S. Pat. No. 12,300,075), which is a continuation application of U.S. application Ser. No. 18/082,890, filed Dec. 16, 2022 (now U.S. Pat. No. 11,776,348), which is a continuation application of U.S. patent application Ser. No. 17/377,189, filed Jul. 15, 2021 (now U.S. Pat. No. 11,557,164), which is a continuation of U.S. patent application Ser. No. 16/826,522, filed Mar. 23, 2020 (now U.S. Pat. No. 11,080,961), which is a continuation of U.S. patent application Ser. No. 16/725,133, filed Dec. 23, 2019 (now U.S. Pat. No. 10,657,754). The contents of the aforementioned applications are incorporated herein by reference in their entirety.

BACKGROUND

Contactless card products have become so universally well-known and ubiquitous that they have fundamentally changed the manner in which financial transactions and dealings are viewed and conducted in society today. Contactless card products are most commonly represented by plastic or metal card-like members that are offered and provided to customers through credit card issuers (such as banks and other financial institutions). With a card, an authorized customer or cardholder is capable of purchasing services and/or merchandise without an immediate, direct exchange of cash. Data security and transaction integrity are of critical importance to businesses facilitating these transactions and to the customers. This need continues to grow as electronic transactions performed with contactless cards constitute an increasingly large share of commercial activity. Accordingly, there is a need to provide businesses and users with an appropriate solution that overcomes current deficiencies to provide data security, authentication, and verification for contactless cards.

Credit card cloning, or "skimming," is a technique whereby a malicious actor copies credit card information from a credit card associated with an account onto a counterfeit card. Cloning is typically performed by sliding the credit card through a skimmer to extract ("skim") the credit card information from a magnetic strip of the credit card and storing the credit card information onto the counterfeit card. The counterfeit card may then be used to incur charges to the account.

EMV (originally Europay, Mastercard, Visa) defines a standard for use of smart payment cards as well as terminals and automated teller machines that accept them.

EMV cards are smart cards (i.e., chip cards or IC (integrated circuit) cards) that include integrated circuits configured to store card information in addition to magnetic stripe information (for backward compatibility). EMV cards include both cards that are physically inserted (or "dipped") into a reader as well as contactless cards that may be read over a short distance using near-field communication (NFC) technology.

Some EMV cards use chip and PIN (personal identification number) technology to overcome the above-identified problems associated with cloning. For example, to authorize a transaction, a user may enter a PIN at a transaction terminal following a card swipe. A stored PIN, retrieved from the card by the transaction terminal, may be compared against the PIN entered, and the transaction may be approved only in the event of a match between the two. Such a solution may reduce fraudulent activity, but remains vulnerable to PIN theft caused by eavesdropping or man-in-the-middle or other types of attack.

BRIEF SUMMARY

In some embodiments, a method for dual factor authentication can includes receiving encrypted data from a contactless card within a communication range of a short-range communication antenna, communicating the encrypted data to an authenticating device, soliciting a user personal identification number (PIN) in response to authentication of the encrypted data by the authenticating device, receiving an input PIN from the contactless card when the contactless card is within the communication range of the short-range communication antenna, communicating the input PIN to the authenticating device, the authenticating device storing a record PIN for the contactless card, and authorizing a transaction request initiated in connection with the contactless card in response to matching of the input PIN with the record PIN by the authenticating device.

In some embodiments, the method can include encrypting the input PIN for communication to the authenticating device.

In some embodiments, the input PIN can include an EMV PIN stored in an EMV applet on the contactless card.

In some embodiments, the method can include receiving the EMV PIN from the EMV applet via a first applet on the contactless card in communication with the EMV applet.

In some embodiments, the method can include receiving the encrypted data from the first applet.

In some embodiments, the method can include authorizing the transaction request in response to matching of the EMV PIN with the record PIN by the authenticating device.

In some embodiments, the method can include communicating with the EMV applet via a first applet on the contactless card, wherein the first applet can act as a communication bridge to the EMV applet.

In some embodiments, a method for dual factor authentication can include receiving encrypted data from a contactless card within a communication range of a short-range communication antenna, communicating the encrypted data to an authenticating device, soliciting a user personal identification number (PIN) in response to authentication of the encrypted data by the authenticating device, receiving an input PIN from a user interface, communicating the input PIN to the contactless card, the contactless card storing a record PIN, and authorizing a transaction request initiated in connection with the contactless card in response to matching of the input PIN with the record PIN by the contactless card.

In some embodiments, the method can include communicating the input PIN to the contactless card responsive to the contactless card being within the communication range of a short-range communication antenna.

In some embodiments, the record PIN can include an EMV PIN stored in an EMV applet on the contactless card.

In some embodiments, the method can include communicating the input PIN to the EMV applet via a first applet on the contactless card in communication with the EMV applet.

In some embodiments, the method can include receiving the encrypted data from the first applet.

In some embodiments, the method can include authorizing the transaction request in response to matching of the input PIN with the EMV PIN by the EMV applet.

In some embodiments, the method can include receiving a matching notification from the EMV applet via a first applet on the contactless card in communication with the EMV applet.

In some embodiments, the method can include communicating with the EMV applet via a first applet on the contactless card, wherein the first applet can act as a communication bridge to the EMV applet.

In some embodiments, a mobile device can include a processor, and a memory storing instructions that, when executed by the processor, can cause the processor to receive encrypted data from a contactless card within a communication range of a short-range communication antenna, communicate the encrypted data to an authenticating device, solicit a user personal identification number (PIN) in response to authentication of the encrypted data by the authenticating device, receive an input PIN, communicate the input PIN to a separate device storing a record PIN for the contactless card, and authorize a transaction initiated in connection with the contactless card in response to matching of the input PIN with the record PIN by the separate device.

In some embodiments, the input PIN can be received from the contactless card when the contactless card is within the communication range of the short-range communication antenna, and the separate device can include the authenticating device.

In some embodiments, the input PIN can include an EMV PIN stored in an EMV applet on the contactless card, and the EMV PIN can be received from the EMV applet via a first applet on the contactless card in communication with the EMV applet.

In some embodiments, the input PIN can be received from a user interface, the separate device can include the contactless card, and where input PIN can be communicated to the contactless card responsive to the contactless card being within the communication range of a short-range communication antenna.

In some embodiments, the record PIN can include an EMV PIN stored in an EMV applet on the contactless card, and the input PIN can be communicated to the EMV applet via a first applet on the contactless card in communication with the EMV applet.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A is a block diagram of a data transmission system configured to provide multi-factor authentication of customer requests using personal identification numbers (PINs) according to an example embodiment.

FIG. 1B is a data flow diagram illustrating one embodiment of a sequence for providing authenticated access using data stored on a contactless card.

FIG. 16 illustrates an example of a message in accordance with one embodiment.

DETAILED DESCRIPTION

Figure 2A:
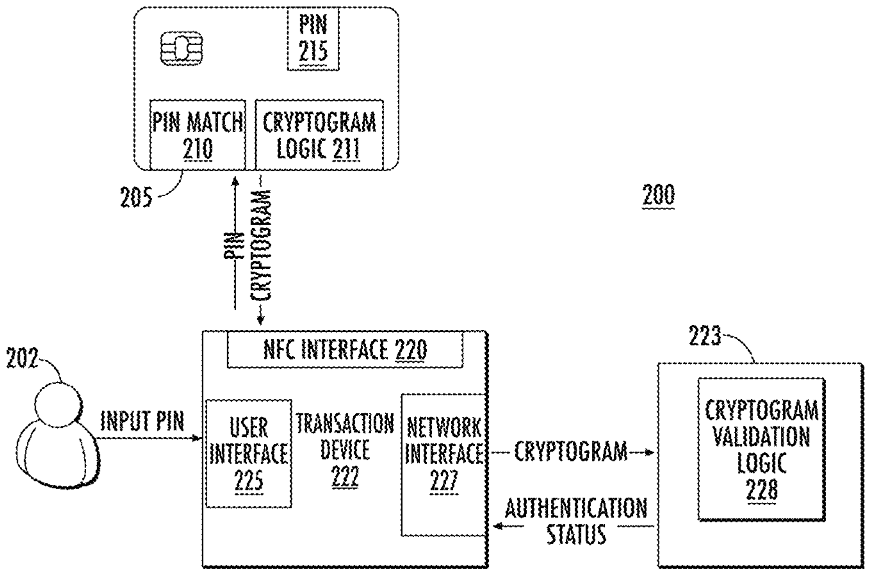
FIG. 2A illustrates one embodiment of a system for dual-factor PIN based authentication as disclosed herein.

Data security and transaction integrity are of critical importance to businesses and consumers. This need continues to grow as electronic transactions constitute an increasingly large share of commercial activity, and malicious actors become increasingly aggressive in efforts to breach transaction security.

Some known systems and methods that can provide data security, authentication, and verification for contactless cards only require proof of a contactless card being present. That is, these known systems and methods do not require a personal identification number (PIN). However, use of a PIN can provide multifactor authentication by requiring both something a user has, i.e., the contactless card, and something the user knows, i.e., the PIN. Advantageously, embodiments of the present disclosure can provide a system, a method, and a device for multi-factor authentication of transactions received at a client device using a personal identification number (PIN) in conjunction with a contactless card.

The contactless card may include a substrate including a memory storing one or more applets, a counter value, and one or more keys. In some embodiments, the memory may further store a PIN, which controls use of the contactless card as described herein. In one embodiment, the counter value may be used to generate a unique cryptogram that may be used to authenticate contactless card transactions. The cryptogram may be used together with the PIN to provide dual factor authentication of contactless card transactions.

The cryptogram may be formed as described in U.S. patent application Ser. No. 16/205,119 filed Nov. 29, 2018, by Osborn, et al., entitled "Systems and Methods for Cryptographic Authentication of Contactless Cards" and incorporated herein by reference (hereinafter the '119 application). In some embodiments, the cryptogram may be formed from a cryptographic hash of a shared secret, a plurality of keys, and a counter value.

According to one aspect, the cryptogram may be used together with the PIN to provide multifactor authentication of contactless card transactions. Multifactor authentication may involve validating a user's knowledge of the PIN prior or subsequent to or as part of authenticating a transaction using the cryptogram. In some embodiments, the cryptogram may be formed using the PIN. In some embodiments, the cryptogram may include an encoded PIN. In either case, transaction security is maintained because the PIN is never broadcast in a discernible format and thus, the potential for theft is reduced. Such an arrangement, which uses the PIN together with the cryptogram for dual factor authentication, protects against cloning of the contactless card by unauthorized third parties.

In some embodiments, PIN validation may be performed by the contactless card as a precondition or subsequent to cryptogram generation. In other embodiments, PIN validation may be performed by a transaction device or by a backend authentication server prior or subsequent to or as part of cryptogram authentication. Each of these methods is described in greater detail below.

It is appreciated that in various systems that include clients, client devices, and authentication servers, the functions of PIN storage, encryption, and authentication may be performed by different components. In some embodiments, a copy of the PIN may be maintained in a memory of the contactless card. In such an embodiment, the copy of the PIN may be used to validate a user of the contactless card as part of a cryptogram authentication process. In some embodiments, the PIN may be used to generate a digital signature or the cryptogram. In some embodiments, cryptogram authentication may be performed by the transaction device, the authentication server, or some combination thereof.

The present system, thus, provides dual-factor authentication that establishes both knowledge (i.e., PIN number) and possession (i.e., the contactless card and a dynamic key), thereby reducing the ability of malicious actors to successfully clone the contactless card.

These and other features of disclosed embodiments will now be described with reference to the figures, wherein like reference numerals are used to refer to like elements throughout. With general reference to notations and nomenclature used herein, the detailed description that follows may be presented in terms of program processes executed on a computer or a network of computers. These process descriptions and representations are used by those skilled in the art to most effectively convey the substance of their work to others skilled in the art.

A process may be here and generally conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms such as adding or comparing, which are commonly associated with mental operations performed by a human operator. No such capability of a human operator is necessary or desirable in most cases in any of the operations described herein that form part of one or more of the disclosed embodiments. Rather, the operations are machine operations. Useful machines for performing operations of various disclosed embodiments include general purpose digital computers or similar devices.

Various embodiments also relate to an apparatus or a system for performing these operations. This apparatus may be specially constructed for the required purpose, or it may comprise a general-purpose computer selectively activated or reconfigured by a computer program stored in the computer. The processes presented herein are not inherently related to a particular computer or other apparatus. Various general-purpose machines may be used with programs written in accordance with the teachings herein, or it may prove convenient to construct a more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well-known structures and devices are shown in block diagram form to facilitate a description thereof. The intention is to cover all modifications, equivalents, and alternatives consistent with the claimed subject matter.

FIG. 1A illustrates a data transmission system according to an example embodiment. As further discussed below, the system 100 may include a contactless card 105, a client device 110, a network 115, and a server 120. Although FIG. 1A illustrates single instances of the components, the system 100 may include any number of components.

The system 100 may include one or more contactless cards 105. In one embodiment, a contactless card 105 comprises a card of credit-card dimension, including an embedded integrated circuit, a storage device, and an interface that permits the contactless card 105 to communicate with a transmitting device using an NFC protocol. A contactless card that may be used herein includes that described in the '119 application, for example.

The system 100 may include the client device 110, which may be a network-enabled computer. As referred to herein, a network-enabled computer may include, but is not limited to a computer device or a communications device including, e.g., a server, a network appliance, a personal computer, a workstation, a phone, a handheld PC, a personal digital assistant, a thin client, a fat client, an Internet browser, a point-of-sale (POS) device, or other device. The client device 110 also may be a mobile device; for example, a mobile device may include an iPhone, an iPod, or an iPad from Apple®, any other mobile device running Apple's iOS® operating system, any device running Microsoft's Windows® Mobile operating system, any device running Google's Android® operating system, and/or any other smartphone, tablet, or like wearable mobile device.

The client device 110 may include processing circuitry and a memory, and it is understood that the processing circuitry may contain additional components, including processors, memories, error and parity/CRC checkers, data encoders, anti-collision algorithms, controllers, command decoders, security primitives, and tamper proofing hardware, as necessary to perform the functions described herein. The client device 110 may further include a display and input devices. The display may be any type of device for presenting visual information, such as a computer monitor, a flat panel display, and a mobile device screen, including liquid crystal displays, light-emitting diode displays, plasma panels, and cathode ray tube displays. The input devices may include any device for entering information into the client device 110 that may be available and supported by the client device 110, such as a touch-screen, a keyboard, a mouse, a cursor-control device, a microphone, a digital camera, a video recorder, or a camcorder. These devices may be used to enter information and interact with software and other devices described herein.

In some examples, the client device 110 of the system 100 may execute one or more applications, such as software applications, that enable, for example, network communications with one or more components of the system 100 to transmit and/or receive data.

The client device 110 may be in communication with one or more servers 120 via one or more networks 115 and may operate as a respective front-end to back-end pair with the server 120. The client device 110 may transmit, for example, from a mobile device application executing on the client device 110, one or more requests to the server 120. The one or more requests may be associated with retrieving data from the server 120. The server 120 may receive the one or more requests from the client device 110. Based on the one or more requests from the client device 110, the server 120 may be configured to retrieve the data requested from one or more databases (not shown). Based on receipt of the data requested from the one or more databases, the server 120 may be configured to transmit the data received to the client device 110, such that the data received may be responsive to the one or more requests.

The system 100 may include one or more networks 115. In some examples, the network 115 may be one or more of a wireless network, a wired network, or any combination of wireless network and wired network and may be configured to connect the client device 110 to the server 120. For example, the network 115 may include one or more of a fiber optics network, a passive optical network, a cable network, an Internet network, a satellite network, a wireless local area network (LAN), a Global System for Mobile Communication, a Personal Communication Service, a Personal Area Network, a Wireless Application Protocol, a Multimedia Messaging Service, an Enhanced Messaging Service, a Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 115 may include, without limitation, telephone lines, fiber optics, IEEE Ethernet 902.3, a wide area network, a wireless personal area network, a LAN, or a global network, such as the Internet. In addition, the network 115 may support an Internet network, a wireless communication network, a cellular network, or the like, including any combination thereof. The network 115 may further include one network or any number of the exemplary types of networks mentioned above, operating as a stand-alone network or in cooperation with each other. The network 115 may utilize one or more protocols of one or more network elements to which the network 115 is communicatively coupled. The network 115 may translate to or from other protocols to one or more protocols of network devices. Although the network 115 is depicted as a single network, it should be appreciated that according to one or more examples, the network 115 may comprise a plurality of interconnected networks, such as, for example, the Internet, a service provider's network, a cable television network, corporate networks, such as credit card association networks, and home networks.

The system 100 may include one or more servers 120. In some examples, the server 120 may include one or more processors, which are coupled to memory. The server 120 may be configured as a central system, server, or platform to control and call various data at different times to execute a plurality of workflow actions. The server 120 may be configured to connect to the one or more databases. The server 120 may be connected to at least one client device 110. In some embodiments, the server 120 may be an authentication server configured to perform cryptogram authentication as disclosed herein.

FIG. 1B is a timing diagram illustrating an exemplary sequence for authenticating contactless card transactions according to one or more embodiments of the present disclosure. In particular, FIG. 1B describes an exemplary process for exchanging authentication data, including a cryptogram, between a contactless card 105 and a client device 110. The system 100 may comprise the contactless card 105 and the client device 110, which may include an application 122 and a processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between the client device 110 and the contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format. For example, a reader, such as the application 122, may transmit a message, such as an applet select message, with an applet ID of an NDEF producing applet. Upon confirmation of the application select message, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret.

Session keys may then be generated. In one embodiment, a diversified key may be generated by using a cryptographic hash to combine a master symmetric key with a dynamic counter value maintained by the contactless card 105. Examples of cryptographic hash algorithms that may be used include symmetric encryption algorithms, a Hash-Based Message Authentication (HMAC) algorithm, and a cypher-based message authentication code (CMAC) algorithm. Non-limiting examples of the symmetric encryption algorithms that may be used to encrypt a username and/or the cryptogram may include a symmetric encryption algorithm, such as 3DES (Triple Data Encryption Algorithm) or Advanced Encryption Standard (AES) 128; a symmetric (HMAC) algorithm, such as HMAC-SHA-256; and a symmetric CMAC algorithm, such as AES-CMAC. It is understood that numerous forms of encryption are known to those of skill in the art, and the present disclosure is not limited to those specifically identified herein.

The MAC cryptogram may be created from the message, which may include the header and the shared secret. In some embodiments, shared information, including but not limited to a shared secret and/or the PIN, may then be concatenated with one or more blocks of random data and encoded using a cryptographic algorithm and the diversified key to generate the MAC cryptogram. Thereafter, the MAC cryptogram and the header may be concatenated and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, the application 122 may be configured to transmit a request to the contactless card 105, the request comprising an instruction to generate the MAC cryptogram.

At step 106, the contactless card 105 sends the MAC cryptogram to the application 122. In some examples, transmission of the MAC cryptogram occurs via NFC; however, the present disclosure is not limited thereto. In other examples, this communication may occur via Bluetooth, Wi-Fi, or other means of wireless data communication.

At step 108, the application 122 communicates the MAC cryptogram to the processor 124.

At step 112, the processor 124 verifies the MAC cryptogram pursuant to an instruction from the application 122. For example, the MAC cryptogram may be verified by an authorization server, such as the server 120 of FIG. 1A. The authorization server may store, for each client device 110, a copy of the counter, the shared secret, and the keys of the client device 110. In some embodiments, as described in more detail below, the authorization server may also store a PIN associated with the client device 110. The authorization server may update the counter for each contactless card transaction according to a protocol established between the client device 110 and the authorization server such that counters remain synchronized. The authorization server may use its copy of the counter, the shared secret, the keys, and/or the PIN to construct an expected MAC cryptogram.

In some examples, the MAC cryptogram may function as a digital signature for purposes of verification. Other digital signature algorithms, such as public key asymmetric algorithms, e.g., the Digital Signature Algorithm, the RSA algorithm, or zero knowledge protocols, may be used to perform this verification.

The authorization server may compare the MAC cryptogram received from the contactless card 105 to the expected MAC cryptogram generated by the authorization server. Such an arrangement improves transaction security in a variety of manners. First, the dynamic nature of the cryptogram resulting from its construction using variable counter values that are periodically updated according to a protocol established between the client device 110 and the server 120 reduces the ability of a malicious third party to re-use authentication information. Second, the use of cryptographic algorithms further protects sensitive information from discovery via eavesdropping. Third, incorporating PIN code validation together with cryptogram authentication adds a knowledge qualifier for dual-factor authentication.

Figure 2B:
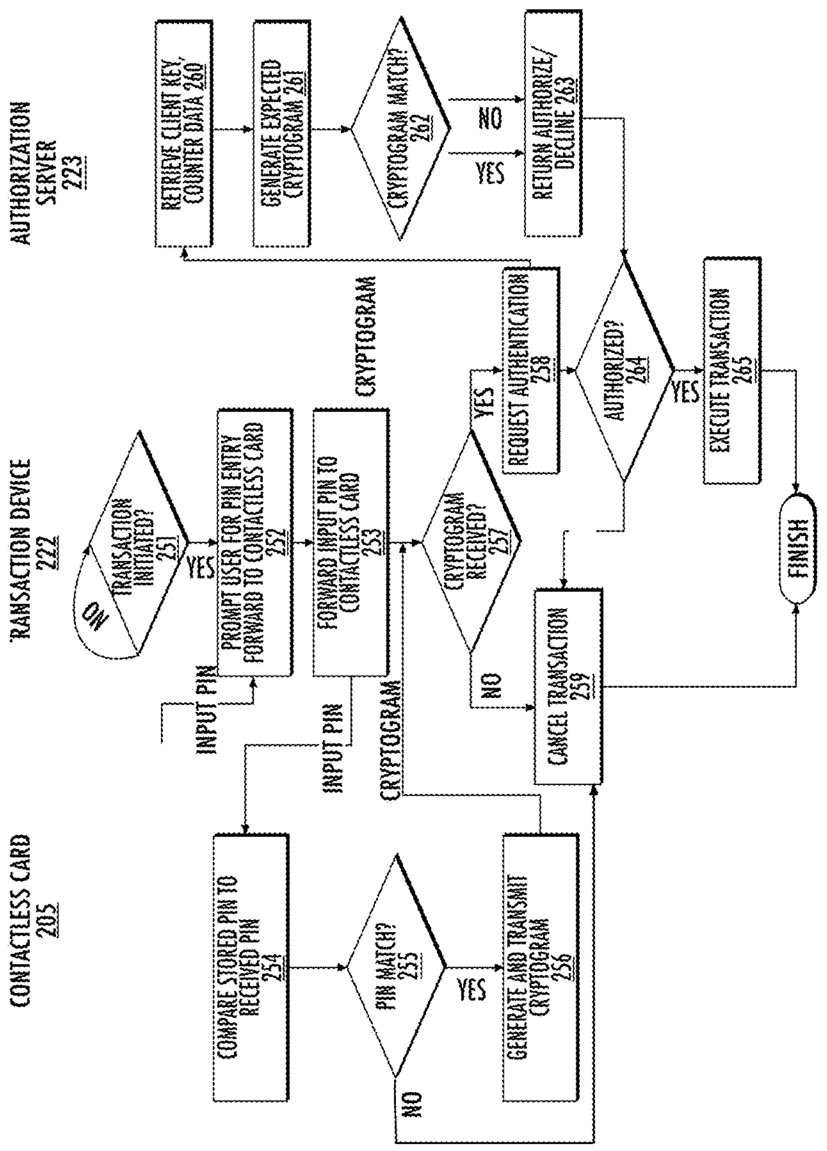
FIG. 2B illustrates one embodiment of a method for dual-factor PIN based authentication as disclosed herein.

FIGS. 2A and 2B illustrate a system and a process of one embodiment of a dual factor authentication system configured to support authentication methods using a PIN together with and/or as part of a cryptogram.

In the system 200 of FIG. 2A, the transaction device 222 (which may be a client mobile device, a merchant transaction device, or any device comprising NFC communication capability) is shown to include a user interface 225 for receiving information, such as an input PIN, from a user 202. The transaction device 222 also is shown to include an NFC interface 220 configured to support NFC communications with a contactless card 205 and a network interface 227 configured to support network communications, including but not limited to internet protocol (IP) communications with an authentication server 223.

According to one aspect, the contactless card 205 comprises PIN match logic 210, which may include hardware, software, or a combination thereof configured to compare a PIN stored in contactless card memory to a PIN received from the transaction device 222, for example, as part of an NDEF record. The contactless card 205 also includes cryptogram generation logic 211 configured to generate a cryptogram, for example, as disclosed in the '119 application.

The cryptogram generation logic 211 may comprise a combination of hardware and software components, including but not limited to a storage device configured to store one or more keys and a counter value for the contactless card 205. The contactless card 205 may further include counters, and encryption and/or hashing hardware and software, etc., for use in generating a diversified, dynamic key for use in encoding messages from the contactless card 205. In some embodiments, the cryptogram logic 211 may be implemented at least in part as an applet stored in a memory of the contactless card 205. Although the PIN logic 210 and the cryptogram logic 211 are shown separately delineated, it is appreciated that the functionalities thereof may be differently apportioned in various embodiments. For example, in some embodiments, the PIN logic 210 and the cryptogram logic 211 may be implemented by a single applet.

The authentication server 223 is shown to include cryptogram validation logic 228. The cryptogram validation logic 228 may comprise a combination of hardware and software components, including but not limited to storage devices storing client keys, counter values, and counters, encryption and/or hashing hardware and software, etc. In one embodiment, the cryptogram validation logic 228 may be configured to generate diversified, dynamic keys for use in generating an expected cryptogram, and the cryptogram validation logic 228 may compare the expected cryptogram to a received cryptogram from the transaction device 222. Matching cryptograms indicate a coordination between the counters of the contactless card 205 and the authentication server 223. In addition, matching cryptograms may also indicate knowledge of information, such as shared secrets, PINs, and the like.

FIG. 2B illustrates a method for dual factor authentication using the system of FIG. 2A. At step 251, a transaction is initiated by the user 202; for example, the user may seek to access an account, make a purchase, or otherwise perform an action that benefits from the dual factor authentication method disclosed herein. At step 252, the user 202 is prompted to enter an input PIN and upon receipt of the input PIN, the transaction device 222 may initiate a dual-authentication cryptogram exchange with the contactless card 205, for example, by prompting the user to tap the card 205 on the transaction device 222 or otherwise bring the contactless card 205 in a communication range with the transaction device 222.

When the contactless card 205 is within the communication range of the transaction device, at step 253, the transaction device 222 forwards the input PIN to the contactless card 205, for example, as a PIN record, and issues a read of an NFC tag associated with a cryptogram generating applet. At step 254, the PIN match logic 210 may compare the input PIN against the stored PIN 215. If a 'match' is determined at step 255, then the cryptogram logic 211 is instructed to generate a cryptogram at step 256 and to transmit the cryptogram back to the transaction device 222.

If, at step 257, a cryptogram is not received, for example, due to a PIN mismatch, at step 259, the transaction may be cancelled. If a cryptogram is received at step 257, then at step 258, the transaction device 222 requests authentication of the transaction, forwarding the cryptogram to the authentication server 223.

At step 260, upon receipt of the cryptogram by the authentication server 223, the authentication server 223 retrieves client data, including counters, keys, shared secrets, and the like that are associated with the contactless card 205. Using this information, at step 261, the authentication server 223 generates an expected cryptogram, and at step 262, determines whether the generated cryptogram corresponds to the unique digital signature provided by the received cryptogram. At step 263, the authentication server returns an authorize/decline response to the transaction device 222. If the transaction device 222 determines, at step 264, that the transaction is authorized, then the transaction may be executed at step 265. If the transaction is declined, then the transaction device 222 cancels the transaction at step 250.

The disclosed dual-factor PIN based authentication system improves upon transaction security by protecting the stored PIN 215 from discovery; as discussed, the stored PIN is not publicly transmitted and thus, cannot be obtained by malicious monitoring during a PIN exchange. In the event that a PIN, a shared secret, and/or a counter value may be obtained via skimming, a cloned card without knowledge of the dynamic counter protocol implemented between the contactless card 205 and the authentication server would be inoperable 223.

Figure 3A:
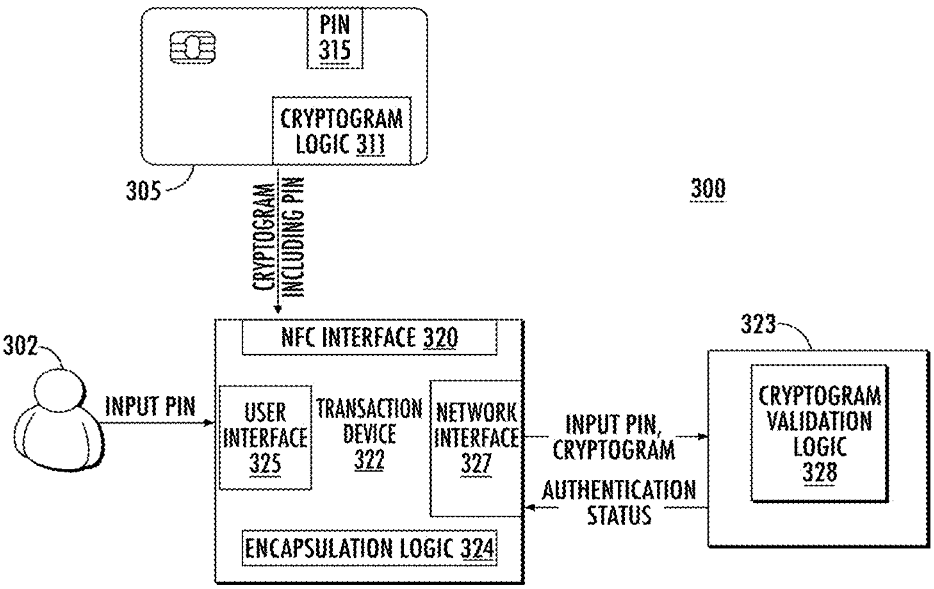
FIG. 3A illustrates an alternate embodiment of a system for dual-factor PIN based authentication as disclosed herein.
Figure 3B:
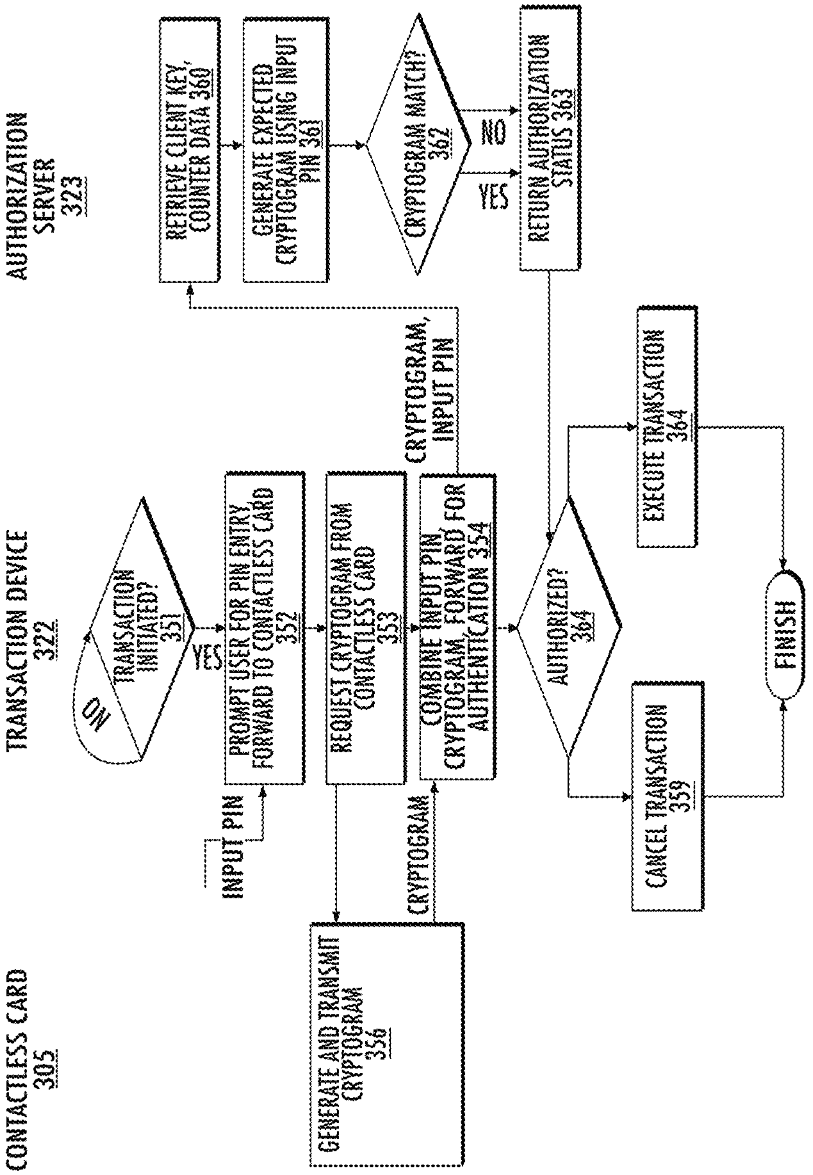
FIG. 3B illustrates an alternate embodiment of a method for dual-factor PIN based authentication as disclosed herein.

FIGS. 3A and 3B disclose another embodiment of a dual-factor pin based authorization system and method, where PIN match functionality may be provided as part of cryptogram validation logic 328 by the authentication server 323. In the system 300 of FIG. 3A, the contactless card 305 stores the unique PIN 315 for the contactless card and comprises cryptogram logic 311, which, as described above, may comprise a cryptogram generating applet. According to one embodiment and described in more detail below, the cryptogram provided by the contactless card 305 may include and/or be formed using the PIN 315.

The transaction device 322 includes a user interface 325, an NFC interface 320 and a network interface 327. In addition, the transaction device 322 may include encapsulation logic 324 which may, in one embodiment, comprise code for encrypting the input PIN and/or the cryptogram prior to forwarding the input PIN/cryptogram pair to the authentication server 323.

The authentication server 323 includes cryptogram validation logic 328, which may operate to extract the input PIN from the encrypted input PIN/cryptogram pair. The cryptogram validation logic 328 may be further configured to generate an expected cryptogram using the input PIN and stored client data, such as counter and key data. The cryptogram validation logic 328 may then compare the expected cryptogram against the extracted cryptogram to determine a match, indicating correlation between the input PIN and the stored PIN, as well as counter and key information.

FIG. 3B is a flow diagram of a dual factor authentication process that may be performed by system 300. After a transaction is initiated at step 351, at step 352 the user 302 is prompted for an input PIN. At step 353, a cryptogram authentication process is initiated as described above, for example the transaction device 322 may issue an NFC read operation to an NDEF tag producing applet of the card 305, in particular an NDEF tag producing applet configured to retrieve the PIN 315 from the contactless card 305 for inclusion in the cryptogram payload. At step 356, the applet of the contactless card may assemble cryptogram data in the form of <UserID><Counter><MAC of UserID+Counter+PIN). In some embodiments, a diversified key, formed using the counter, may be used to encode the <MAC of UserID+Counter+PIN> using a cryptographic hashing algorithm or the like. Public key asymmetric algorithms, e.g., the Digital Signature Algorithm and the RSA algorithm, or zero knowledge protocols, may be used to perform this verification or may alternatively be used.

The contactless card 305 returns the cryptogram to the transaction device 322, and at step 354, the transaction device 322 combines the input PIN with the received cryptogram. In some embodiments, the input PIN and/or the received cryptogram may be encrypted to obfuscate the input PIN information, for example, using symmetric encryption algorithms. The combination is forwarded to the authentication server 323.

At step 360, the authentication server 323 retrieves authentication information (including a counter value, keys, a shared secret or the like) related to the contactless card from storage. Using this information, at step 361, the authentication server may assemble an expected cryptogram, for example, in the form of <MAC of UserID+stored Counter+input PIN>. At step 362, the authentication server determines whether there is a match between the expected cryptogram and the cryptogram retrieved from the contactless card and returns the authorization status to the transaction device 322 at step 363. In response to receipt of the authorization status at step 364, the transaction either proceeds at step 364 or is cancelled at step 359.

Accordingly, in the embodiment of FIGS. 3A and 3B, although the cryptogram generated by the contactless card is formed using the PIN, the PIN itself is not transmitted in a discernible or derivable form over the network.

Figure 4A:
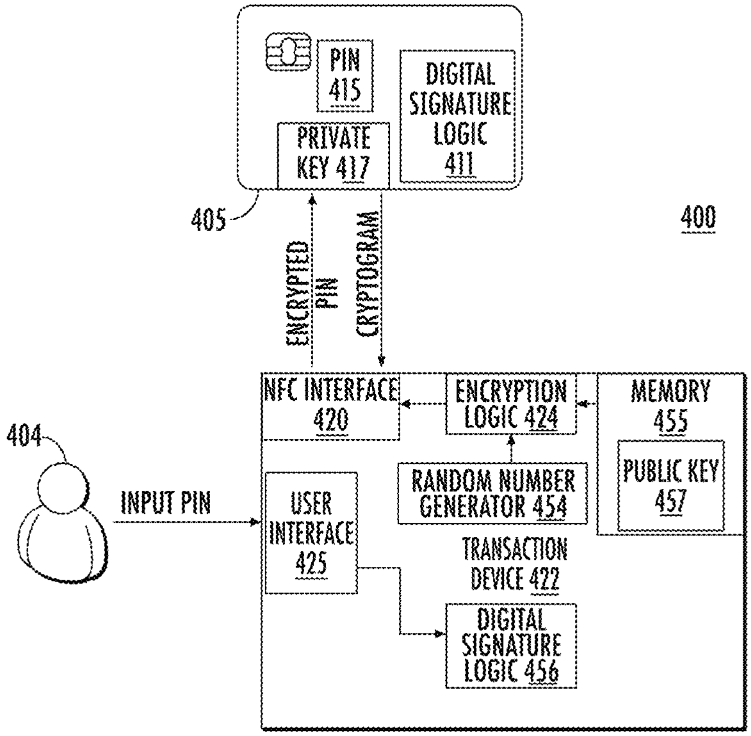
FIG. 4A illustrates an alternate embodiment of a system for dual-factor PIN based authentication as disclosed herein.
Figure 4B:
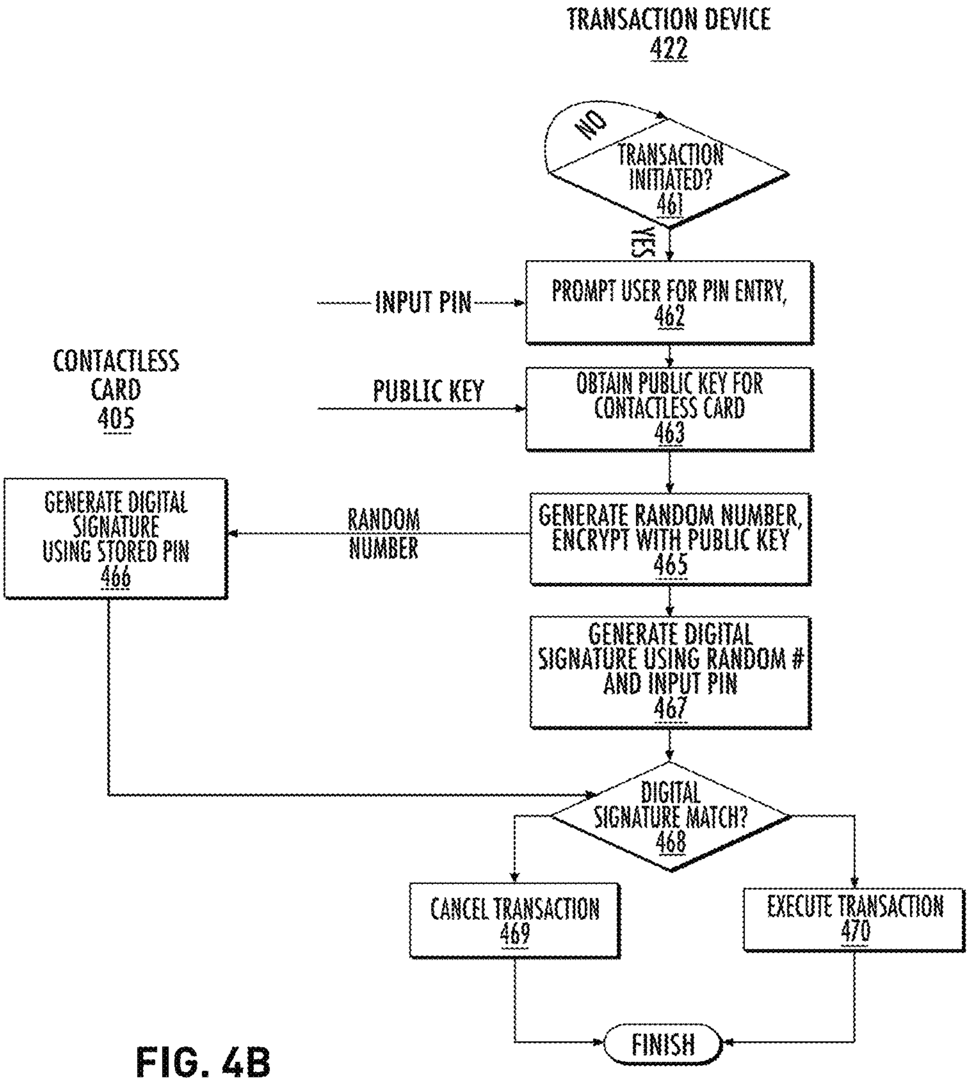
FIG. 4B illustrates an alternate embodiment of a method for dual-factor PIN based authentication as disclosed herein.

FIGS. 4A and 4B disclose another embodiment of a dual-factor pin based authorization system and method, where PIN match may be performed by the transaction device using public key cryptography. In one embodiment, the contactless card 405 maintains a private key 417. The private key 417 is known only to the contactless card 405 and may be used to decrypt communications encrypted via the public key. The contactless card may further include digital signature logic 411 configured to generate a unique digital signature and/or a cryptographic hash to provide the cryptogram for communication to the transaction device 422.

The transaction device 422 includes a user interface 425 and an NFC interface 420. The transaction device is shown to further include a random number generator 454, encryption logic 424 and a memory storing 455 storing a public key 457 associated with the contactless card 405, where the public key may be retrieved by the transaction device from a trusted, certified authority. The transaction device further includes digital signature logic 456 for generating a digital signature as described below. In some embodiments, the public key of the card 405 may be stored by the card 405 and read by the transaction device as part of the authentication process.

A method for dual-factor authentication using the system 400 of FIG. 4A is shown in FIG. 4B. When it is determined, at step 461, that a transaction has been initiated, at step 462, the user 404 is prompted to enter an input PIN. At step 463, the transaction device obtains the public key associated with the contactless card, either from the card itself, or from a trusted certification authority. At step 465, the transaction device generates a random number, which it encrypts with the public key and forwards to the contactless card 405. At step 466, the contactless card decrypts the random number using its private key and generates a digital signature using a combination of the random number and the stored PIN 415. The resulting digital signature is forwarded back to the transaction device 422.

At step 467, the transaction device 422 also generates a digital signature, using the random number in conjunction with the input PIN received from the user 402. At step 468 the digital signatures are compared to identify a match. Depending upon the match status, the transaction is either executed at step 470 (match) or canceled at step 469 (mismatch).

Figure 5A:
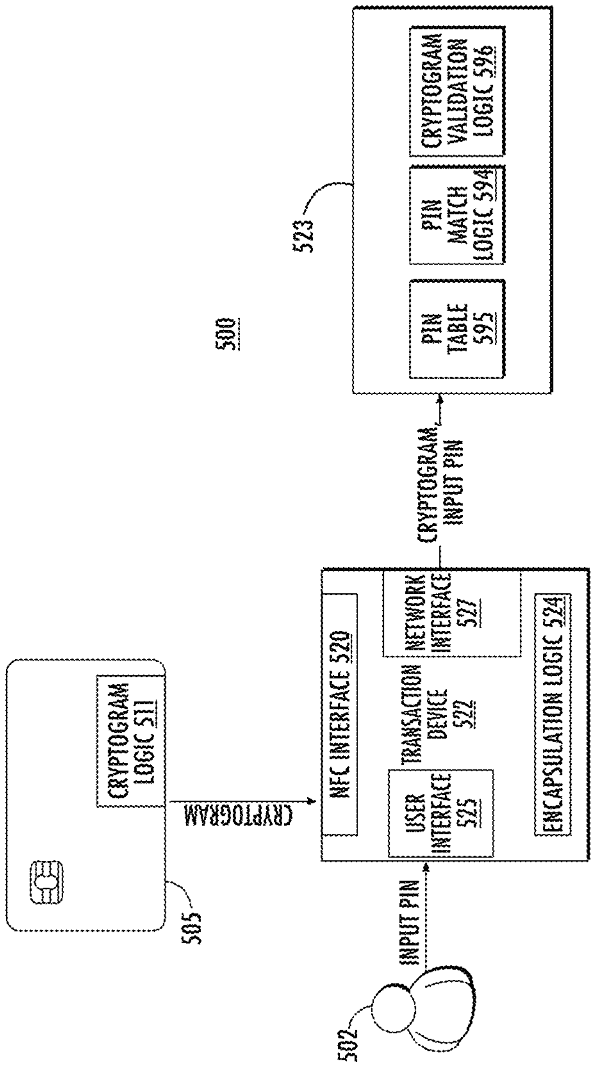
FIG. 5A illustrates an alternate embodiment of a system for dual-factor PIN based authentication as disclosed herein.
Figure 5B:
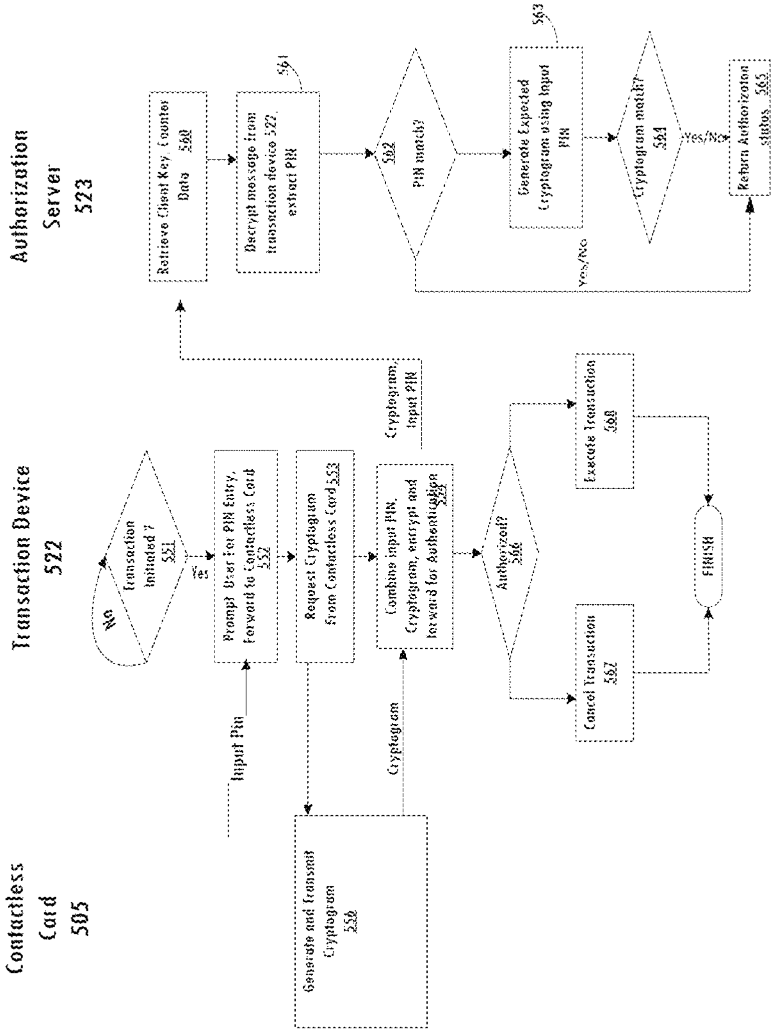
FIG. 5B illustrates an alternate embodiment of a method for dual-factor PIN based authentication as disclosed herein.

FIGS. 5A and 5B disclose another embodiment of a dual-factor pin based authorization system and method, where contactless card PINs are stored at the authentication server and used in conjunction with the cryptograms to authenticate transactions. In the system 500 of FIG. 5A, the contactless card 505 includes cryptogram logic 511 for generating a cryptogram using a combination of counters, dynamic keys, shared secrets and the like as described above. The transaction device 522 includes a user interface 520, an NFC interface 525, and a network interface 527. In addition, the transaction device 522 may include encapsulation logic 524 which may, in one embodiment, comprise code for encrypting the input PIN and/or cryptogram prior to forwarding the input PIN/cryptogram pair to the authentication server 523. The authentication server 523 includes a PIN table 595, PIN match logic 594, and cryptogram validation logic 596.

A method for dual-factor authentication using the system 500 of FIG. 5A is shown in FIG. 5B. Following initiation of a transaction at step 551, at step 552, the user 502 is prompted for an input PIN, and at step 553, the transaction device 522 requests a cryptogram from the contactless card 505. At step 555 the contactless card generates a cryptogram and returns it to the transaction device 522. At step 554, the transaction device combines the input PIN, received from the user, with the cryptogram from the contactless card, encrypts it and forwards it to the authentication server 523. At step 560, the authorization server retrieves a PIN, a counter, and keys associated with the contactless card 505. At step 561, the authorization server decrypts the message from the transaction device 522, extracts the input PIN, and at step 562, compares the extracted input PIN to the expected input PIN retrieved from the PIN table. At step 563, the authentication server 523 may also extract the cryptogram retrieved from contactless card 505. The authentication server 523 may construct an expected cryptogram using a stored key, a counter, and shared secret information stored by the cryptogram validation logic. At step 564, the transaction device may compare the expected cryptogram to the extracted cryptogram to determine a match. In response to the comparisons, the authentication server 523 returns authorization status to the transaction device at step 565. In response to receipt of the authorization status at step 566, the transaction is either executed at step 568 (match) or canceled at step 567 (mismatch).

Figure 11A:
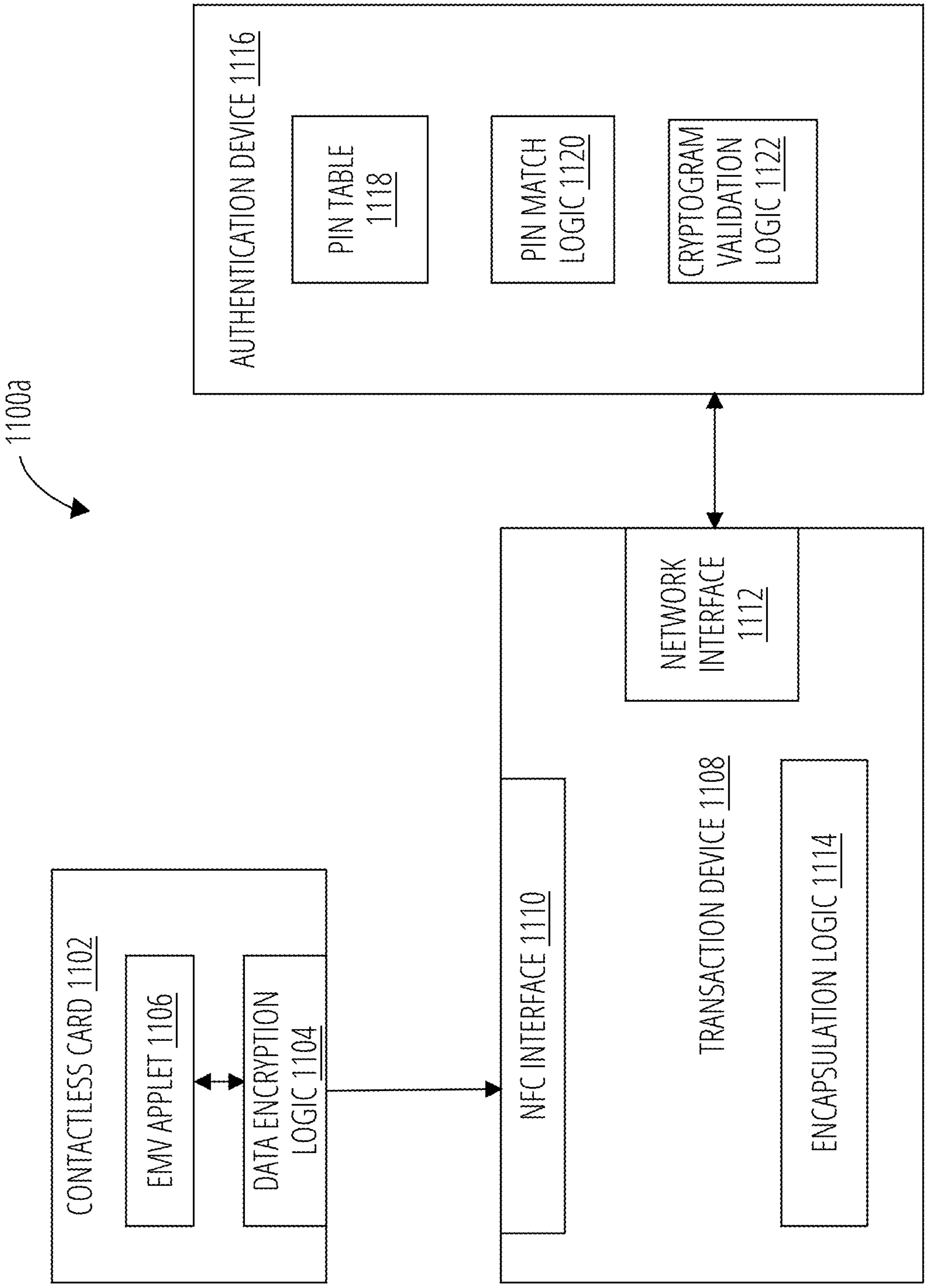
FIG. 11A illustrates an alternate embodiment of a system for dual-factor PIN based authentication as disclosed herein.
Figure 11B:
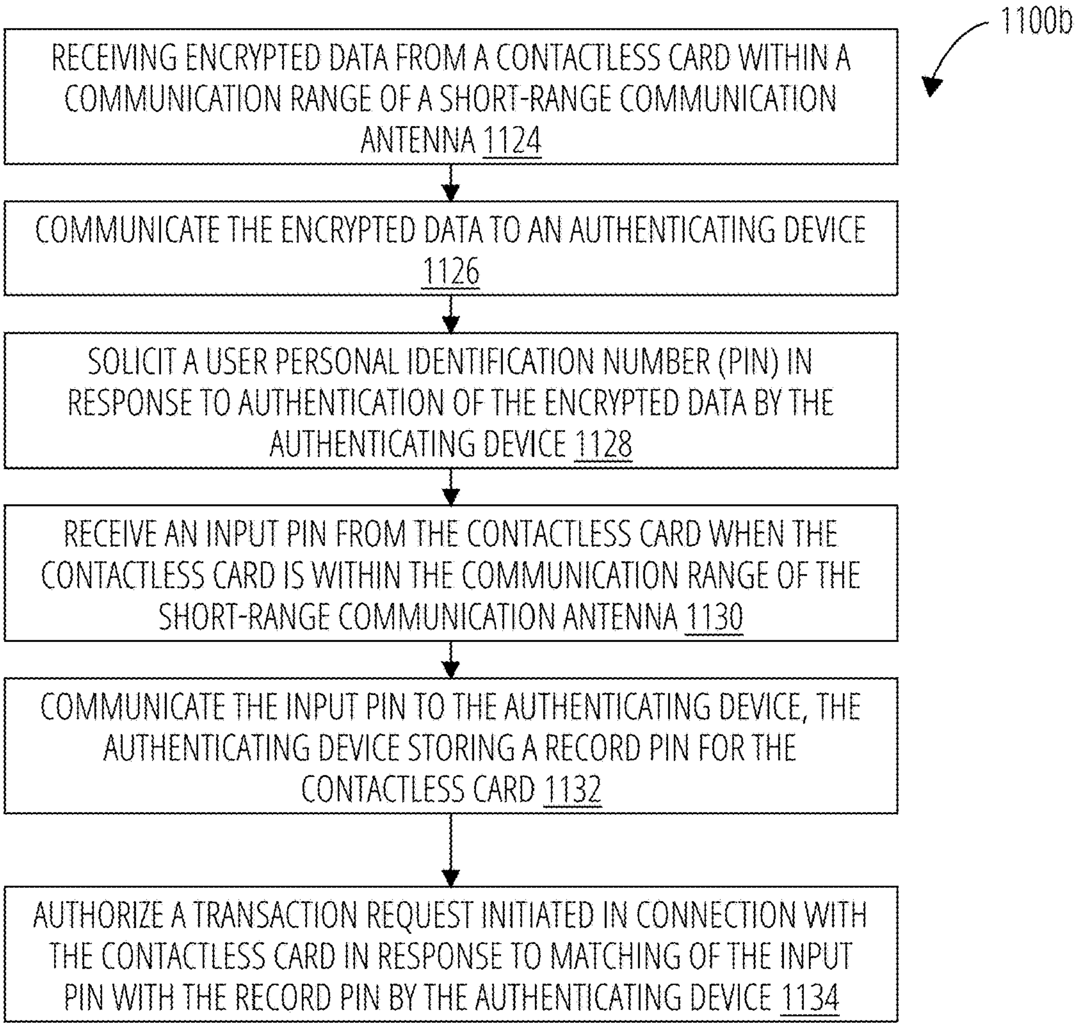
FIG. 11B illustrates an alternate embodiment of a method for dual-factor PIN based authentication as disclosed herein.

FIG. 11A and FIG. 11B disclose another embodiment of a dual-factor pin based authorization system and method in which contactless card PINs are stored at an authentication server and used in conjunction with cryptograms to authenticate transactions.

In the system **1100*a* of FIG. 11A, a contactless card 1102 can include data encryption logic 1104 for generating encrypted data, such as, for example, a cryptogram, using a combination of counters, dynamic keys, shared secrets and the like as disclosed herein. In some embodiments, the data encryption logic 1104 can include a first applet, including hardware, software, memory, or a combination thereof configured to generate the encrypted data as disclosed herein. The contactless card 1102 can also include an EMV applet 1106 for storing a contactless card PIN. In some embodiments, the EMV applet 1106 can include chip logic and/or an EMV chip, including hardware, software, memory, or a combination thereof configured to store the contactless card PIN, and in some embodiments, the EMV applet 1106 can store an EMV PIN. As seen, the EMV applet 1106 can communicate with the data encryption logic 1104; in particular, in some embodiments, the EMV applet 1106 can communicate with a transaction device 1108 via the data encryption logic 1104**.

The transaction device 1108 can include a client mobile device, a merchant transaction device, or any device comprising NFC communication capability. In particular, the transaction device 1108 can include a short-range communication antenna, such as, for example, an NFC interface 1110, for communication with the contactless card 1102 when the contactless card 1102 is within a communication range of the NFC interface 1110 and a network interface 1112 for communication with an authentication server. In some embodiments, the transaction device 1108 can also include encapsulation logic 1114 that can encrypt PINs or other data prior to forwarding to the authentication server.

The authentication server can include an authentication device 1116, which can include a PIN table 1118 for storing contactless card PINs cross-referenced to contactless cards, PIN match logic 1120 for determining whether received PINs match the contactless card PINs in the PIN table 1118, and cryptogram validation logic 1122 for decrypting, authenticating, and validating received encrypted data as disclosed herein. In some embodiments, the authentication server can include a validator server and data can be routed through a switchboard system as described in connection with FIGS. 13-21.

A method 1100*b* for dual-factor authentication using the system 1100*a* of FIG. 11A is shown in FIG. 11B. In some embodiments, the transaction device 1108 can execute some or all of the method 1100*b*.

As seen, the method 1100*b* can include receiving encrypted data from a contactless card within a communication range of a short-range communication antenna as in 1124. For example, when the contactless card 1102 is within a communication range of the NFC interface 1110, the transaction device 1108 can receive the encrypted data from and generated by the data encryption logic 1104. Then, the method 1100*b* can include communicating the encrypted data to an authenticating device as in 1126. For example, the network interface 1112 can communicate the encrypted data to the authentication device 1116 and/or to a validator server and be routed through a switchboard system as described in connection with FIGS. 13-21.

Responsive to authentication of the encrypted data by the authenticating device, the method 1100*b* can include soliciting a user personal identification number (PIN) as in 1128. For example, the cryptogram validation logic 1122 can authenticate the encrypted data, and responsive to the network interface 1112 receiving an authentication message from the authentication device 1116 or the validator server indicative thereof, the transaction device 1108 can solicit the user PIN, for example, via one or more audio or visual messages emitted by or displayed on a user interface.

Responsive thereto and when the contactless card is within the communication range of the short-range communication antenna, the method 1100*b* can include receiving an input PIN from the contactless card as in 1130. For example, when the contactless card 1102 is within the communication range of the NFC interface 1110, the transaction device 1108 can receive the input PIN from the EMV applet 1106.

In some embodiments, the input PIN can include an EMV PIN stored in the EMV applet 1106 on the contactless card 1102. In these embodiments, the method 1100*b* can also include receiving the EMV PIN from the EMV applet 1106 via a first applet on the contactless card 1102 in communication with the EMV applet 1106, for example, via the data encryption logic 1104. In particular, in some embodiments, the method 1100*b* can include communicating with the EMV applet 1106 via the data encryption logic 1104 so that the data encryption logic 1104 acts as a communication bridge between the EMV applet 1106 and the transaction device 1108.

Finally, the method 1100*b* can include communicating the input PIN to the authenticating device as in 1132 and authorizing a transaction request initiated in connection with the contactless card in response to matching of the input PIN with a record PIN by the authenticating device as in 1134. For example, the network interface 1112 can communicate the input PIN to the authentication device 1116 and/or to a validator server and be routed through a switchboard system as described in connection with FIGS. 13-21. In some embodiments, the method 1100*b* can include encrypting the input PIN for communication to the authenticating device, including, in some embodiments, in or with the encrypted data. For example, the encapsulation logic 1114 can encrypt the input PIN for communication to the authentication device 1116 or the validator server. The authentication device 1116 or the validator server can store the record PIN for the contactless card 1102, for example, in the PIN table 1118, and the PIN match logic 1120 can match the input PIN with the record PIN. When the input PIN includes the EMV PIN, the PIN match logic 1120 can match the EMV PIN with the record PIN. Responsive to the network interface 1112 receiving a matching notification from the authentication device 1116 or the validator server indicative thereof, the transaction device 1108 can authorize a transaction request initiated in connection with the contactless card 1102.

Figure 12A:
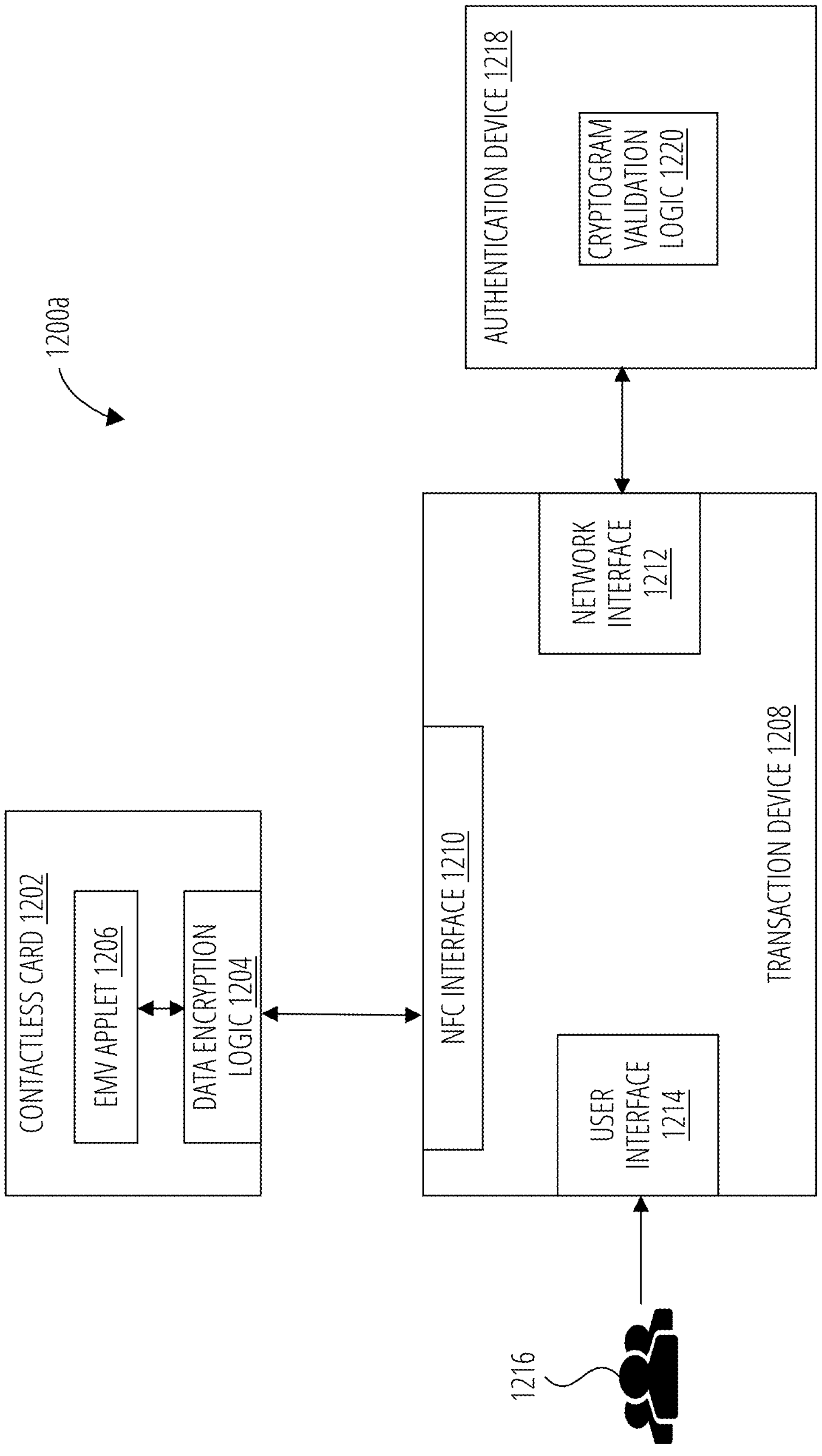
FIG. 12A illustrates an alternate embodiment of a system for dual-factor PIN based authentication as disclosed herein.
Figure 12B:
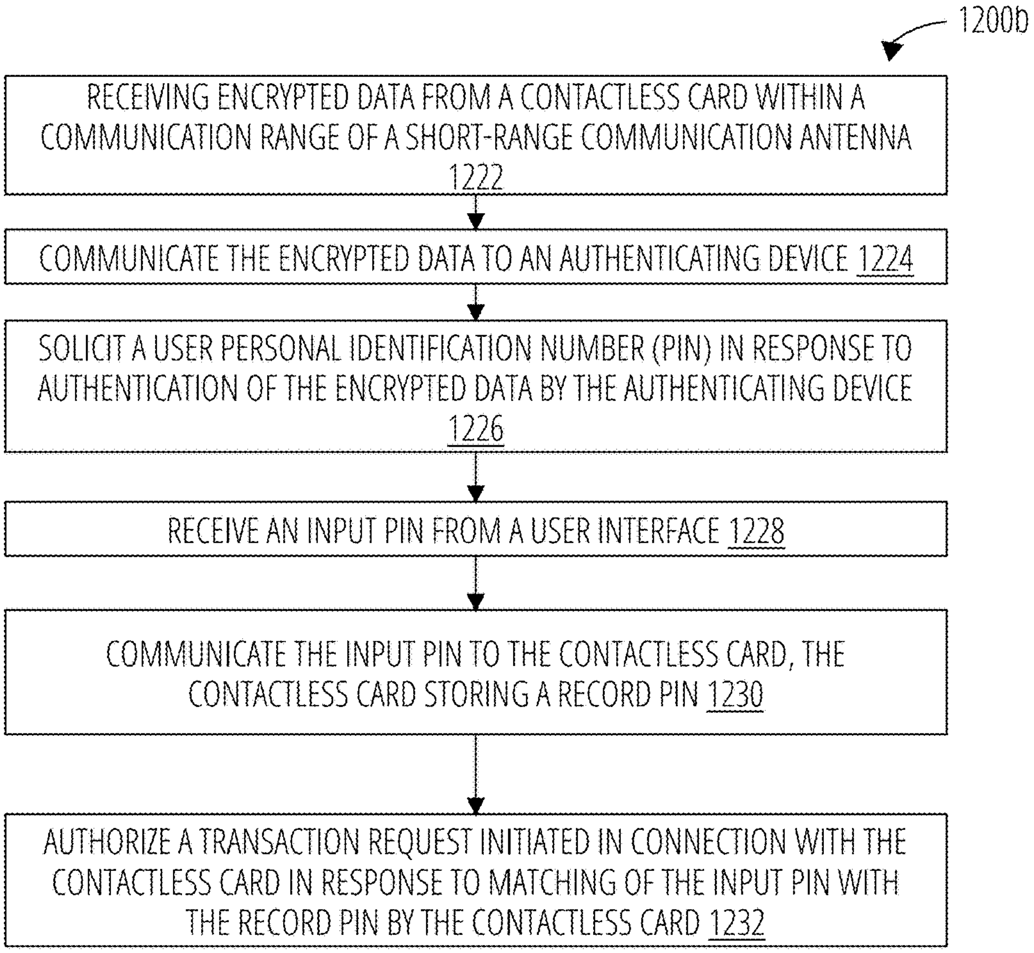
FIG. 12B illustrates an alternate embodiment of a method for dual-factor PIN based authentication as disclosed herein.

FIG. 12A and FIG. 12B disclose another embodiment of a dual-factor pin based authorization system and method in which a contactless card uses a contactless card PIN stored thereon in conjunction with cryptograms generated thereon to authenticate transactions.

In the system 1200*a* of FIG. 12A, the contactless card 1202 can include data encryption logic 1204 for generating encrypted data, such as, for example, a cryptogram, using a combination of counters, dynamic keys, shared secrets and the like as disclosed herein. In some embodiments, the data encryption logic 1204 can include a first applet, including hardware, software, memory, or a combination thereof configured to generate the encrypted data as disclosed herein. The contactless card 1202 can also include an EMV applet 1206 for storing a contactless card PIN. In some embodiments, the EMV applet 1206 can include chip logic and/or an EMV chip, including hardware, software, memory, or a combination thereof configured to store the contactless card PIN, and in some embodiments, the EMV applet 1206 can store an EMV PIN. As seen, the EMV applet 1206 can communicate with the data encryption logic 1204; in particular, in some embodiments, the EMV applet 1206 can communicate with a transaction device 1208 via the data encryption logic 1204.

The transaction device 1208 can include a client mobile device, a merchant transaction device, or any device comprising NFC communication capability. In particular, the transaction device 1208 can include a short-range communication antenna, such as, for example, an NFC interface 1210, for communication with the contactless card 1202 when the contactless card 1202 is within a communication range of the NFC interface 1210 and a network interface 1212 for communication with an authentication server. The transaction device 1208 can also include a user interface 1214.

The authentication server can include an authentication device 1218, which can include cryptogram validation logic 1122 for decrypting, authenticating, and validating received encrypted data as disclosed herein. In some embodiments, the authentication server can include a validator server and data can be routed through a switchboard system as described in connection with FIGS. 13-21.

A method 1200*b* for dual-factor authentication using the system 1200*b* of FIG. 12A is shown in FIG. 12B. In some embodiments, the transaction device 1208 can execute some or all of the method 1200*b*.

As seen, the method 1200*b* can include receiving encrypted data from a contactless card within a communication range of a short-range communication antenna as in 1222. For example, when the contactless card 1202 is within a communication range of the NFC interface 1210, the transaction device 1208 can receive the encrypted data from and generated by the data encryption logic 1204. Then, the method 1200*b* can include communicating the encrypted data to an authenticating device as in 1224. For example, the network interface 1212 can communicate the encrypted data to the authentication device 1218 and/or to a validator server and be routed through a switchboard system as described in connection with FIGS. 13-21.

Response to authentication of the encrypted data by the authenticating device, the method 1200*b* can include soliciting a user personal identification number (PIN) as in 1226. For example, the cryptogram validation logic 1220 can authenticate the encrypted data, and responsive to the network interface 1212 receiving an authentication message from the authentication device 1218 and/or the validator server indicative thereof, the transaction device 1208 can solicit the user PIN, for example, via one or more audio or visual messages emitted by or displayed on the user interface 1214.

Responsive thereto, the method 1200*b* can include receiving an input PIN from a user interface as in 1228. For example, the user interface 1214 can receive the input PIN from a user 1216.

Finally, the method 1200*b* can include communicating the input PIN to the contactless card, for example, when the contactless card 1202 is within the communication range of the short-range communication antenna, as in 1230 and authorizing a transaction request initiated in connection with the contactless card in response to matching of the input PIN with a record PIN by the contactless card as in 1232. For example, the NFC interface 1210 can communicate the input PIN to the contactless card 1202 when the contactless card 1102 is within the communication range of the NFC interface 1210. The contactless card 1202 can store the record PIN for the contactless card 1202, for example, in the EMV applet 1206, and the EMV applet 1206 can match the input PIN with the record PIN. In some embodiments, the data encryption logic 1204 can communicate with the EMV applet 1206 to match the input PIN with the record PIN.

In any embodiment, responsive to the NFC interface 1210 receiving a matching notification from the contactless card 1202 indicative of matching, the transaction device 1208 can authorize a transaction request initiated in connection with the contactless card 1202. Advantageously, in the method 1200*b*, the record PIN is neither stored on nor processed by the transaction device 1208, but rather is handled by the contactless card 1202 itself, including the EMV applet 1206, thereby maintaining security.

In some embodiments, the record PIN can include an EMV PIN stored in the EMV applet 1206 on the contactless card 1202. In these embodiments, the method 1200*b* can also include communicating the input PIN to the EMV applet 1206 via a first applet on the contactless card 1202 in communication with the EMV applet 1206, for example, via the data encryption logic 1204. In particular, in some embodiments, the method 1200*b* can include communicating with the EMV applet 1206 via the data encryption logic 1204 so that the data encryption logic 1204 acts as a communication bridge between the EMV applet 1206 and the transaction device 1208. When the record PIN includes the EMV PIN, the EMV applet 1206 can match the input PIN with the EMV PIN and, responsive thereto, authorize the transaction request.

Accordingly, various systems and methods for providing dual-factor PIN based authentication that uses cryptogram and PIN exchange for multi-factor authentication purposes to reduce and/or eliminate the potential for card cloning have been shown and described. Exemplary components that may be included in a contactless card, transaction device, and or authorization server, together with and/or in place of components already described, to support the described methods will now be described with regard to FIGS. 6-10 and 13-21.

Figure 6:
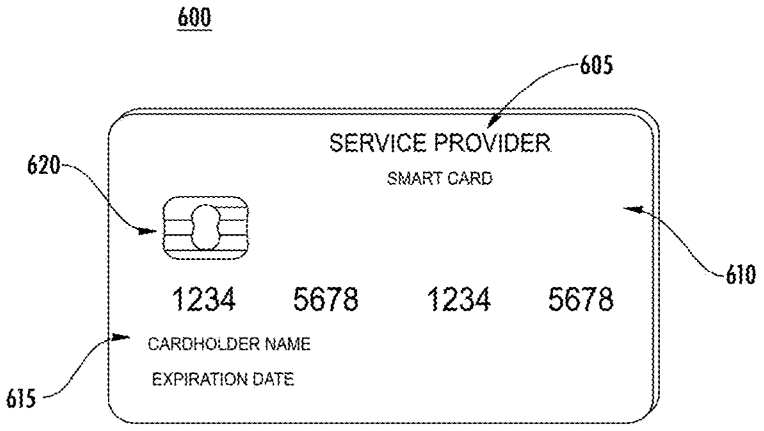
FIG. 6 is an example of a contactless card for storing authentication information that may be used in the system of FIG. 1A.

FIG. 6 illustrates a contactless card 600, which may comprise a payment card, such as a credit card, debit card, or gift card, issued by a service provider 605 whose identity may be displayed on the front or back of the card 600. In some examples, the contactless card 600 is not related to a payment card and may comprise, without limitation, an identification card. In some examples, the payment card may comprise a dual interface contactless payment card. The contactless card 600 may comprise a substrate 610, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 600 may have physical characteristics compliant with the ID-1 format of the ISO/IEC 7810 standard, and the contactless card may otherwise be compliant with the ISO/IEC 14443 standard. However, it is understood that the contactless card 600 according to the present disclosure may have different characteristics, and the present disclosure does not require a contactless card to be implemented in a payment card.

The contactless card 600 may also include identification information 615 displayed on the front and/or back of the card, and a contact pad 620. The contact pad 620 may be configured to establish contact with another communication device, such as a user device, smart phone, laptop, desktop, or tablet computer. The contactless card 600 may also include processing circuitry, antenna and other components not shown in FIG. 6. These components may be located behind the contact pad 620 or elsewhere on the substrate 610. The contactless card 600 may also include a magnetic strip or tape, which may be located on the back of the card (not shown in FIG. 6).

Figure 7:
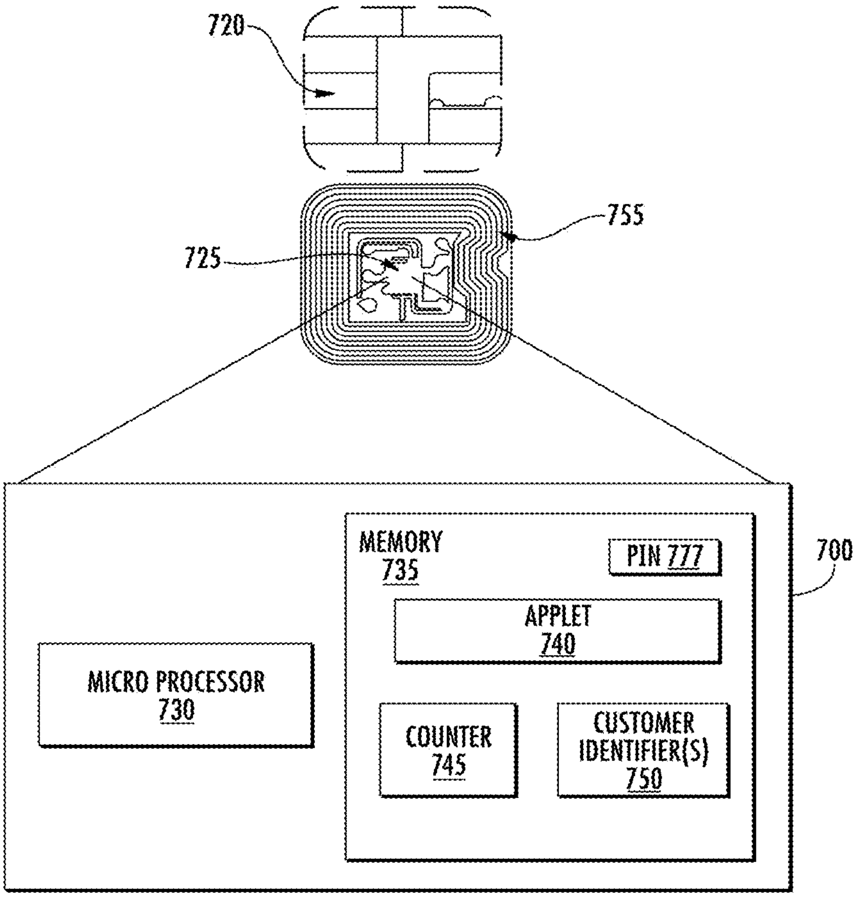
FIG. 7 is a block diagram illustrating exemplary components that may be included in the contactless card of FIG. 6.

As illustrated in FIG. 7, the contact pad 720 may include processing circuitry for storing and processing information, including a microprocessor 730 and a memory 735. It is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein.

The memory 735 may be a read-only memory, write-once read-multiple memory or read/write memory, e.g., RAM, ROM, and EEPROM, and the contactless card 700 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times.

The memory 735 may be configured to store one or more applets 740, one or more counters 745, and a customer information 750. According to one aspect, the memory 735 may also store PIN 777.

The one or more applets 740 may comprise one or more software applications associated with a respective one or more service provider applications and configured to execute on one or more contactless cards, such as a Java Card applet. For example, the applet may include logic configured to generate a MAC cryptogram as described above, including, in some embodiments, a MAC cryptogram that is formed at least in part using PIN information.

The one or more counters 745 may comprise a numeric counter sufficient to store an integer. The customer information 750 may comprise a unique alphanumeric identifier assigned to a user of the contactless card 700 and/or one or more keys that together may be used to distinguish the user of the contactless card from other contactless card users. In some examples, the customer information 750 may include information identifying both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 720 or entirely separate from it, or as further elements in addition to the microprocessor 730 and the memory 735 elements located within the contact pad 720.

In some examples, the contactless card 700 may comprise one or more antennas 725 placed within the contactless card 700 and around the processing circuitry 755 of the contact pad 720. For example, the one or more antennas may be integral with the processing circuitry, and the one or more antennas may be used with an external booster coil. As another example, the one or more antennas may be external to the contact pad 720 and the processing circuitry.

As explained above, the contactless cards 700 may be built on a software platform operable on smart cards or other devices that comprise program code, processing capability and memory, such as JavaCard. Applets may be configured to respond to one or more requests, such as near-field data exchange (NDEF) requests, from a reader, such as a mobile Near Field Communication (NFC) reader and produce an NDEF message that comprises a cryptographically secure OTP encoded as an NDEF text tag.

Figure 8:
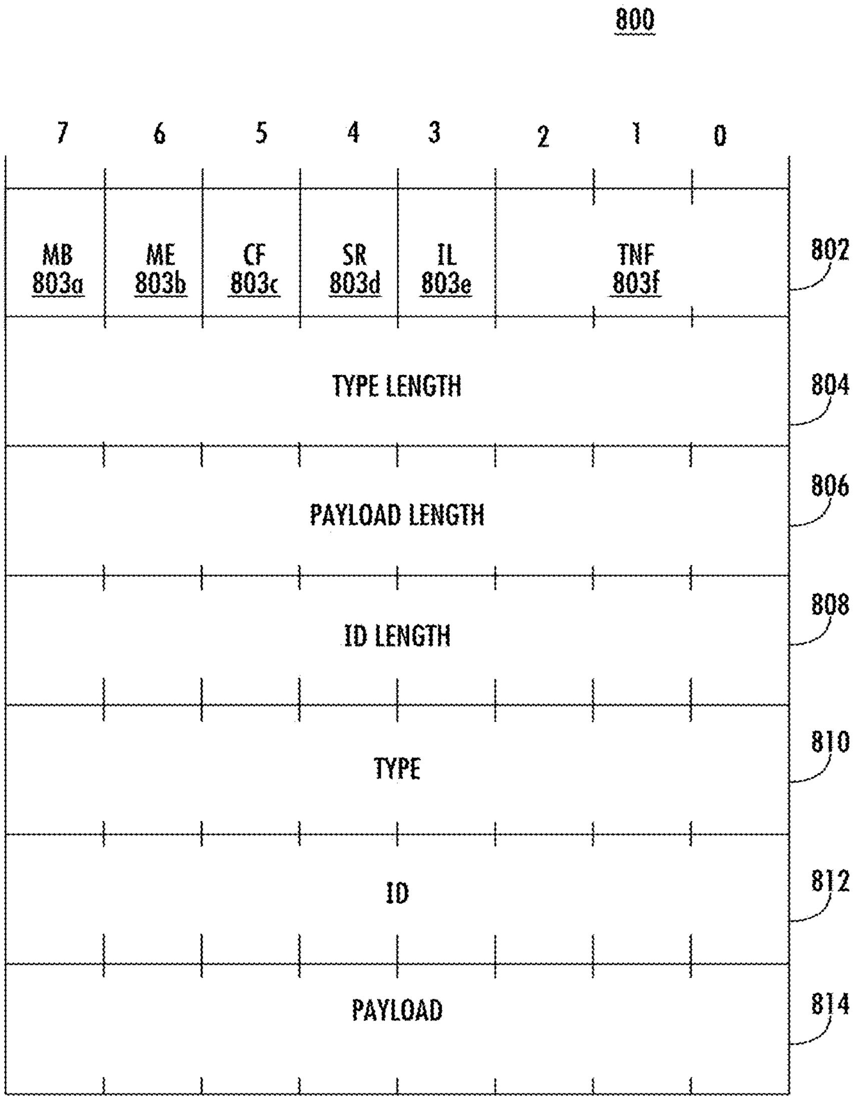
FIG. 8 illustrates exemplary fields of a cryptogram that may be used as part of a PIN exchange as disclosed in various embodiments herein.

FIG. 8 illustrates an exemplary NDEF short-record layout (SR=1) 800 according to an example embodiment. An NDEF message provides a standardized method for a transaction device to communicate with a contactless card. In some examples, NDEF messages may comprise one or more records. The NDEF record 800 includes a header 802 which includes a plurality of flags that define how to interpret the rest of the record, including a Message Begin (MB) flag 803*a* a Message End (ME) flag 803*b*, a Chunk flag (CF) 803*c*, a Short Record (SR) flag 803*d*, an ID Length (IL) flag 803*e* and a Type Name Format (TNF) field 803*f*. MB 803*a* and ME flag 803*b* may be set to indicate the respective first and last record of the message. CF 803*c* and IL flag 803*e* provide information about the record, including respectively whether the data may be 'chunked' (data spread among multiple records within a message) or whether the ID type length field 808 may be relevant. SR flag 803*d* may be set when the message includes only one record.

The TNF field 803*f* identifies the type of content that the field contains, as defined by the NFC protocol. These types include empty, well known (data defined by the Record Type Definition (RTD) of the NFC forum), Multipurpose Internet Mail Extensions (MIME) [as defined by RFC 2046], Absolute Uniform Resource Identifier (URI) [as defined by RFC 3986], external (user defined), unknown, unchanged [for chunks] and reserved.

Other fields of an NFC record include type length 804, payload length 806, ID length 808, Type 810, ID 812 and Payload 814. Type length field 804 specifies the precise kind of data found in the payload. Payload Length 806 contains the length of the payload in bytes. A record may contain up to 4,294,967,295 bytes (or 2^32−1 bytes) of data. ID Length 808 contains the length of the ID field in bytes. Type 810 identifies the type of data that the payload contains. For example, for authentication purposes, the Type 810 may indicate that the payload 814 a cryptogram formed at least in part using a Personal Identification Number (PIN) retrieved from a memory of the contactless card. ID field 812 provides the means for external applications to identify the whole payload carried within an NDEF record. Payload 814 comprises the message.

In some examples, data may initially be stored in the contactless card by implementing STORE DATA (E2) under a secure channel protocol. This data may include a personal User ID (pUID) and PIN that may be unique to the card, as well as one or more of an initial key, cryptographic processing data including session keys, data encryption keys, random numbers and other values that will be described in more detail below. In other embodiments, the pUID and PIN may be pre-loaded into the contactless card, prior to delivery of the contactless card to the client. In some embodiments, the PIN may be selected by a client associated with the contactless card and written back to the contactless card following validation of the client using various stringent authentication methods.

Figure 9:
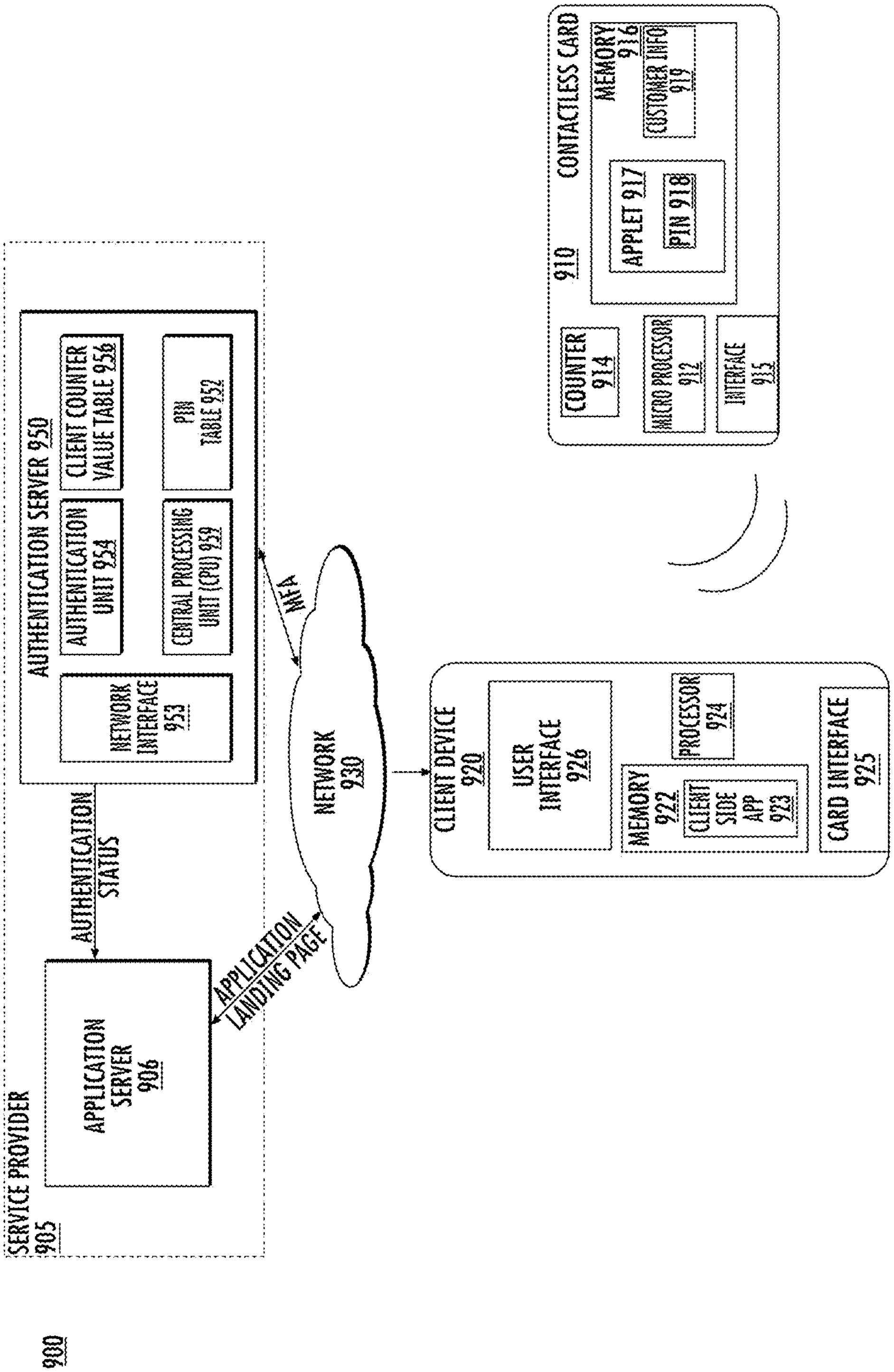
FIG. 9 is a detailed block diagram of components of a system of FIG. 1A that may be utilized to support aspects of various embodiments disclosed herein.

FIG. 9 illustrates a communication system 900 in which one of a contactless card 910 and/or an authentication server 950 may store information that may be used during first-factor authentication. As described with regard to FIG. 3, each contactless card may include a microprocessor 912 and a memory 916 for customer information 919 including one or more uniquely identifying attributes, such as identifiers, keys, random numbers and the like. In one aspect, the memory further includes an applet 917 operable when executed upon by microprocessor 912 for controlling authentication processes described herein. As described above, a PIN 918 may be stored in a memory 916 of the card 910 and accessed by the applet and/or as part of customer information 919. In addition, each card 910 may include one or more counters 914, and an interface 915. In one embodiment the interface operates NFC or other communication protocols.

Client device 920 includes a contactless card interface 925 for communicating with the contactless card and one or more other network interfaces (not shown) that permit the device 920 to communicate with a service provider using a variety of communication protocols as described above. The client device may further include a user interface 929, which may include one or more of a keyboard or touchscreen display, permitting communication between a service provider application and a user of the client device 920. Client device 920 further includes a processor 924 and a memory 922 which stores information and program code controlling operation of the client device 920 when executed upon by the processor, including for example a client-side application 923 which may be provided to the client by a service provider to facilitate access to and use of service provider applications. In one embodiment, the client-side application 923 includes program code configured to communicate authentication information including the PIN code from the contactless card 910 to one or more services provided by the service provider as described above. The client-side app 923 may be controlled via an application interface displayed on user interface 926. For example, a user may select an icon, link or other mechanism provided as part of the application interface to launch the client-side application to access application services, where part of the launch includes validating the client using a cryptogram exchange.

In an exemplary embodiment, a cryptogram exchange includes a transmitting device having a processor and memory, the memory of the transmitting device containing a master key, transmission data, and a counter value. The transmitting device communicates with a receiving device having a processor and memory, the memory of the receiving device containing the master key. The transmitting device may be configured to: generate a diversified key using the master key and one or more cryptographic algorithms and store the diversified key in the memory of the transmitting device, encrypt the counter value using one or more cryptographic algorithms and the diversified key to yield an encrypted counter value, encrypt the transmission data using one or more cryptographic algorithms and the diversified key to yield encrypted transmission data, and transmit the encrypted counter value and encrypted transmission data to the receiving device as a cryptogram. The receiving device may be configured to: generate the diversified key based on the stored master key and the stored counter value and store the diversified key in the memory of the receiving device; and decrypt the encrypted cryptogram (comprising the encrypted counter and encrypted transmission data) using one or more decryption algorithms and the diversified key. The receiving device may authenticate the transmitting device in response to a match between the decrypted counter against the stored counter. Counters may be then be incremented at each of the transmitting and receiving devices for subsequent authentications, thereby providing a cryptogram based dynamic authentication mechanism for transmitting device/receiving device transactions.

As mentioned with regard to FIG. 1A, client device 920 may be connected to various services of a service provider 905 and managed by application server 906. In the illustrated embodiment, the authentication server 950 and application server 906 are shown as separate components, although it should be appreciated that an application server may include all of the functionality described as included in the authentication server.

Authentication server 950 is shown to include a network interface 953 for communicating with network members over network 930 and a central processing unit (CPU) 959. In some embodiments, the authentication server may include non-transitory storage media for storing a PIN table 952 including PIN information related to clients of a service provider. Such information may include but is not limited to, the client username, client personal identifiers, and client keys and counters. In one embodiment the authentication server further includes an authentication unit 954 for controlling the decoding of the cryptogram and extraction of the counter, and a client counter value table 956 which may be used as described below to perform authentication in conjunction with the contactless card 910. In various embodiments, the authentication server may further comprise a PIN table 952 configured with an entry for each client/contactless card pair.

Figure 10:
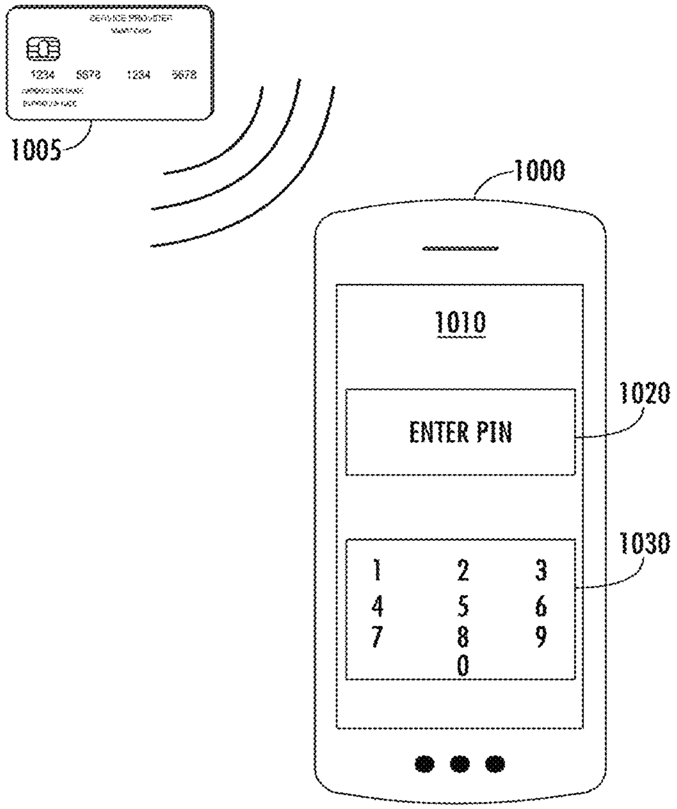
FIG. 10 depicts prompts that may be provided by a user interface of a client device according in one embodiment disclosed herein.

FIG. 10 illustrates one example of a client device 1000 comprising a display 1010 including a prompt window 1020 and an input portion 1030. The prompt portion may display various prompts to guide a client through the authentication process, for example including a prompt 'engage card' to encourage movement of the card 805 towards the device 1000. The prompt may also include an instruction such as 'enter PIN' as shown in FIG. 10 and provide a keyboard or other input mechanism to enable to user to input the PIN. In some embodiments, following successful card tap and PIN entry, a user may be permitted to complete the transaction, for example, complete a charge, gain access to sensitive data, gain access to particular people, etc.

In some instances, contactless card functions discussed herein may be utilized in a multi-issuer computing environment. These functions may include tap-to functions where a user may tap their contactless card on a device, such as a mobile device, to perform a function. For example, a user may utilize their contactless card to verify their identify, perform a payment, launch applications, login into applications, autofill a form or a field, navigate to a specified web location or application on a device, unlock a door, initiate a contactless card, verify themselves, and so forth.

The systems discussed here may enable users to perform these functions in a multi-issuer environment. Further, the systems discussed herein may enable card issuers or payment providers, such as a banks, to issue contactless cards with tap-to functions to customers while maintaining a high-level security. The systems discussed differ from previous solutions because they provide a single platform for multiple issuers to provide the tap-to functionality. Traditionally, each issuer must set up and maintain their own systems to provide contactless card features. This includes maintaining their own hardware, software, databases, security protocols, and so forth, which can become extremely costly for the issuer to maintain. However, embodiments discussed enable issuers to offload much of the processing, storage, and security functionality to a neutral or central system. As will be discussed in more detail, the central system is configured to provide contactless card features for multiple issuers while maintaining a high level of security and data integrity. Each issuer's functionality and data may be separately managed and secured such that one issuer cannot access another issuer's data or functions. As will be discussed in more detail, these features may be provided by a switchboard system that is configured to process and perform each contactless card function in a secure manner. Additional benefits for issuers may include providing a highly secure authentication option for a mobile web, which typically lacks the robust authentication options available in a native application.

Further, embodiments discussed herein support tap-to mobile web experiences on both major mobile platforms (iOS®, Android®) by leveraging App Clips® and Javascript® SDK with WebNFC®. In some embodiments, embodiments discuss herein can also support tap-to-mobile web experiences on mobile platforms by leveraging Instant Apps. For iOS®, embodiments include providing a tap-to software development kit including functions and services to perform the operations discussed herein on the iOS® platform. The SDK may be installed into the host application, e.g., a native app or web browser app, and includes App Clip® support. The SDK provides functional support for near-field communication (NFC) between the mobile device and the contactless card, installing a native app via App Clips®, and functionality to obscure data and/or portions of a display. In one example, the SDK may be configured to download and install the app from an app store, such as Apples® App Store.

In the Android® operating system environment, embodiments include utilizing a JavaScript SDK. The JavaScript SDK may be installed into a website, e.g., via website source code. The JavaScript SDK also includes functions to support NFC between the mobile device and the contactless card via WebNFC®. The JavaScript SDK may also include functions to provide customizable user interface (UI) capabilities and obfuscation. In embodiments, the JavaScript SDK supports websites utilizing Hypertext Transfer Protocol Secure (HTTPS) and supports the React® library. Embodiments are not limited in this manner and other JavaScript UI libraries may be supported.

Figure 13:
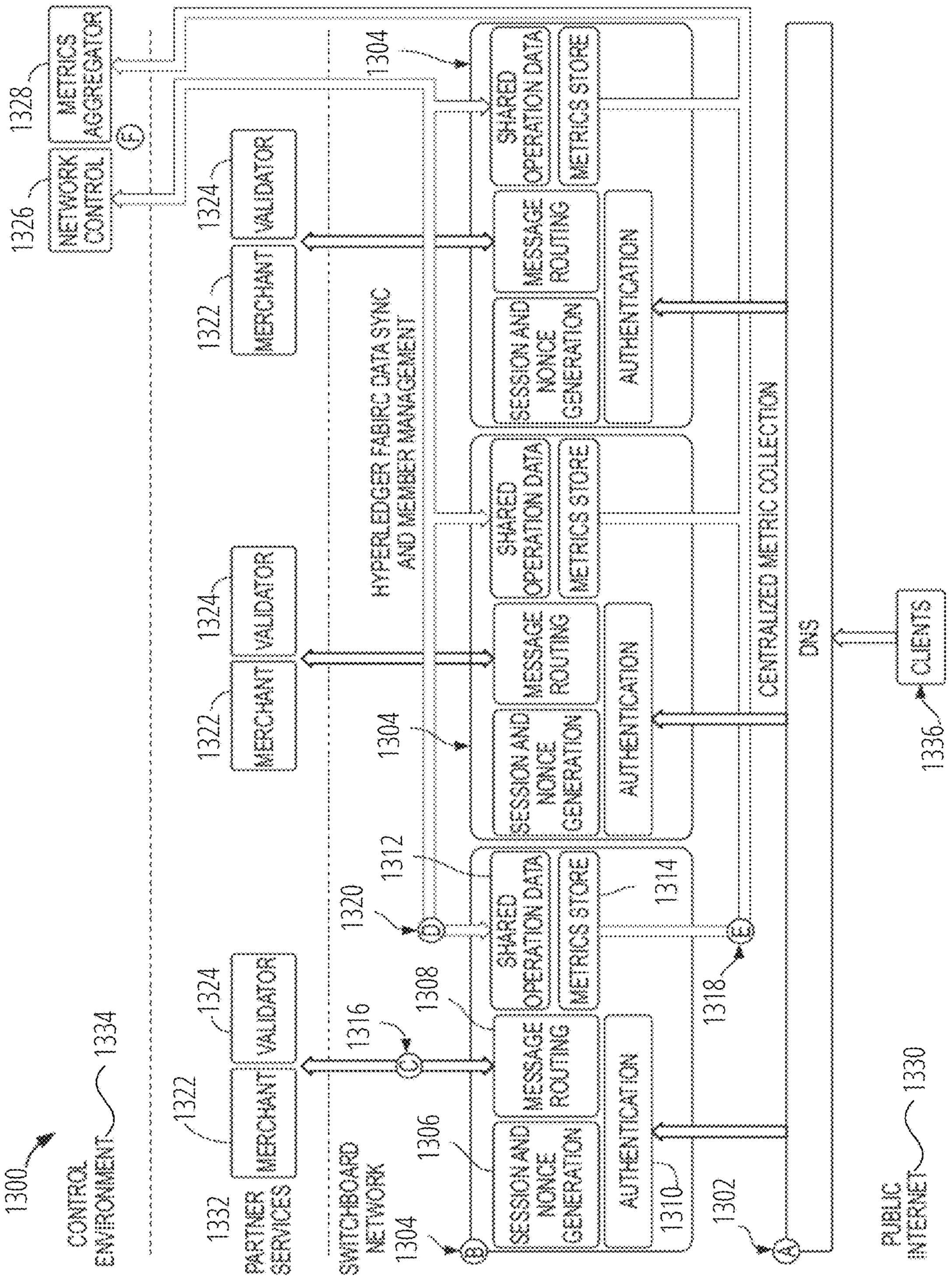
FIG. 13 illustrates an example of a system configured to operate in accordance with one embodiment.

FIG. 13 illustrates an example of system 1300 configured to operate in accordance with the embodiments discussed herein. The system 1300 includes additional devices and systems configured to enable contactless card issuers to tap-to provide card services. Specifically, the system 1300 enables any number of issuer systems to provide card services to their clients through a switching fabric, i.e., a switchboard system, in a secure and safe manner.

In embodiments, the switchboard system includes one or more nodes 1304 configured to perform routing operations. Each switchboard node 1304 may include a session and nonce generator 1306, a message router 1308, an authentication 1310 function, an operation data 1312 store, and a metrics store 1314. Further, each of the nodes may be configured the same and share configurations, but each switchboard node 1304 may independently process and route messages and requests to the appropriate systems, such as merchant systems and issuer systems. Each of the nodes 1304 is configured to act as a broker of trust between an issuer system, a merchant system 1322, and/or a validation system 1324, for example. Each switchboard node 1304 is configured to route each message to the correct issuer system while maintaining data security. For example, a switchboard node 1304 may route a message between an issuer system and a merchant system while the node cannot access the private data in the message.

The switchboard system 1300 may be configured as a server system with a collection of hardware, software, and networking components that work together to provide client services. Hardware components may include one or more server computers, storage devices, and network adapters. The server computers are configured to run server applications, such as those executable on each of the nodes 1304. In some instances, each of the server computers may be configured to operate one or more nodes, e.g., in a virtual environment. The storage devices are configured to store data that is accessed by the applications, and the network adapters are used to connect the server computer to the network.

Each of the server computers may be configured to execute software, including the operating system, the applications, and security software. The networking components of a server system include the network switch, router, and firewall. The network switch is used to connect the server computers to other devices on the network. The router is used to route traffic between different networks. The firewall is used to protect the server system from unauthorized access and attacks.

Figure 14:
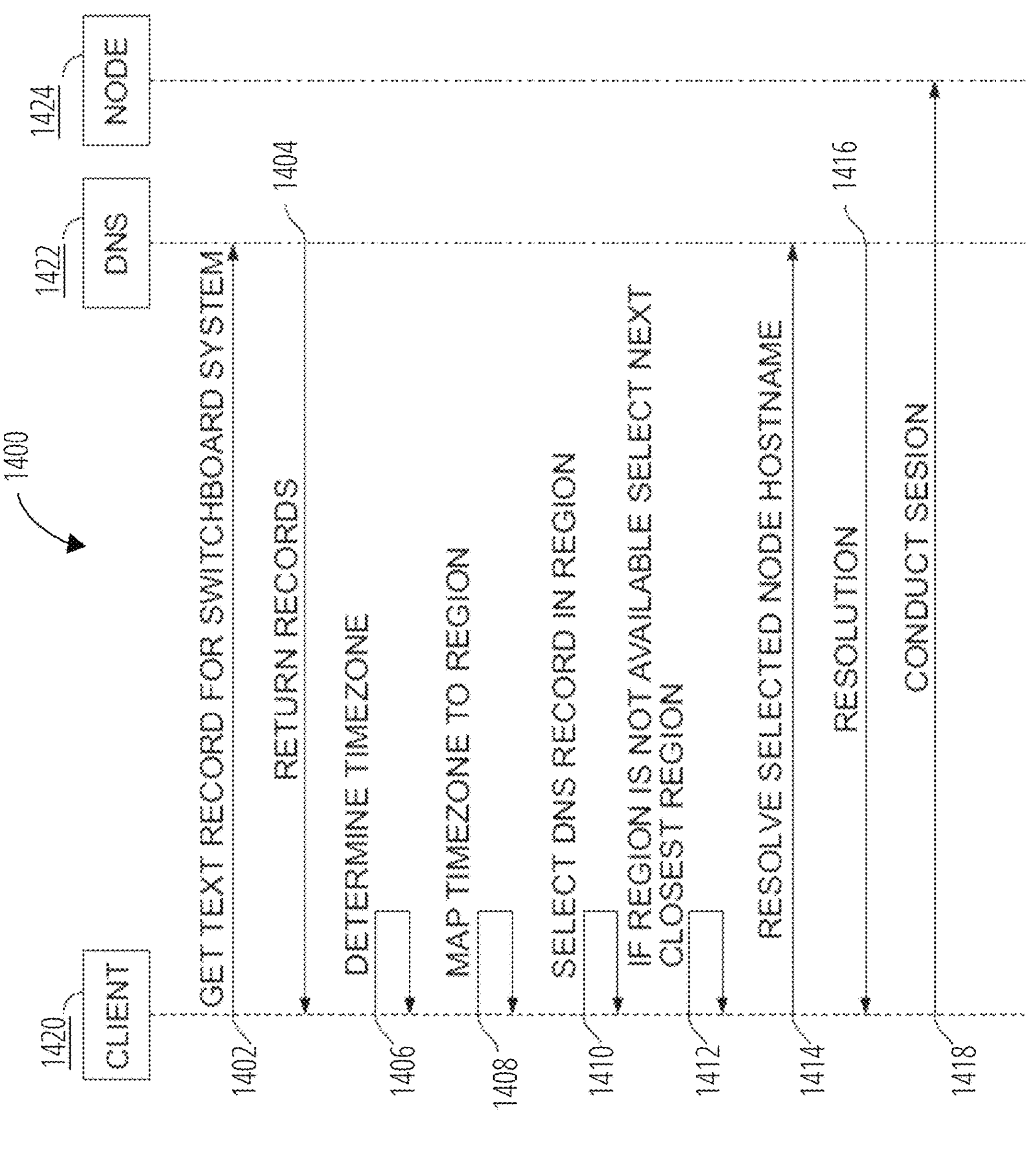
FIG. 14 illustrates an example of a sequence flow in accordance with one embodiment.

In some embodiments, the nodes 1304 may operate in a cloud-based computing environment, e.g., a collection of hardware, software, and networking components that enable the delivery of cloud computing services. The switchboard nodes 1304 and the computing services are delivered over the Internet and can be accessed from anywhere in the world with an Internet connection. In embodiments, client 1336 may access a switchboard node 1304 through a Domain Name System (DNS) 102. The DNS 1302 is a hierarchical and distributed naming system for computers, services, and other resources connected to the Internet or other networks. It associates various information with domain names assigned to each registered participant. In one example, the DNS 1302 may translate a name known to software executing on a client 1336 to route data to one or more of switchboard node 1304 of the switchboard system. In embodiments, the DNS 1302 may generate a number, such as an Internet Protocol (IP) address, an address record (A-record), or another Hostname (C-name record). FIG. 14 illustrates an example a sequence 1400 for a client to identify and resolve an identifier for one of the nodes 1304 of the switchboard system. At a high level, the DNS 1302 translates known domain names to numerical Internet Protocol (IP) addresses needed for locating and identifying computer services and devices with the underlying network protocols. Clients use the global DNS system to select the best node to use, as illustrated in the sequence 1400.

In embodiments, a client 1336 communicates with the switchboard system to perform one or more partner services 1332, such as conducting a transaction with a merchant, validating the customer, or other tap-to functions. Once the client 1336 identifies a switchboard node 1304 and resolves an address to communicate with the switchboard node 1304, the client 1336 may send one or more messages to the switchboard node 1304 to authenticate and perform a desired operation. The switchboard node 1304 includes an authentication 1310 function that is configured to authenticate the client 1336. In embodiments, the client 1336 sends a message or authorization request to the switchboard node 1304 with the following header set:

X-Sb-Api-Key: <CLIENT API KEY>

X-Sb-Dvc-Fngrprnt: Device-specific device fingerprint

The CLIENT API KEY may have the following example structure: 65535-GReyx5BuEAaE72bWbFZJfHRL8Dbt1Uum, where Table 1 describes the value, name, and meaning:

TABLE 1

| Value | Name | Meaning |
| --- | --- | --- |
| 65535 | Client ID | Individual identifier of client |
| GReyx5BuEAaE72bWbFZJfHRL8Db$_{t1}$Unm | Client Key | Randomly assigned key |

The switchboard node 1304 may authorize or authenticate the client 1336 or user, and the switchboard node 1304 may utilize the additional components, such as the session and nonce generator 1306 and the message router 1308, to perform the operations. Note the validation system 1324 never interacts with the merchant systems 1322, nor vice versa. The nodes 1304 brokers all communication.

In embodiments, the switchboard system may utilize a hyper ledger fabric 1320 to manage and synchronize the shared operation data 1312 and member management across the network. The hyper ledger fabric 120 is a distributed ledger framework having a permissioned network model that ensures only authorized participants can join the network and access the data that is stored on a ledger.

In embodiments, the hyper ledger fabric 120 may be generated by creating one or more sets of peers, an ordering service, and a channel. Once the network is created, the system 1300 deploys chaincode to the network, or a node 1304 is permitted to access the fabric. The chaincode is the code that runs on a blockchain and executes a network control 1326 and operation data 1312 logic code. Once the chaincode is deployed, each of the switchboard nodes 1304 is configured to invoke transactions on the blockchain to add data to the blockchain, e.g., operational data. A switchboard node 1304 or another device can query the ledger to retrieve data. The ledger is a distributed database that stores all the data added to the blockchain.

All nodes 1304 keep an independently verifiable log of their actions that can be transmitted to a centralized aggregator to build a picture of overall network usage. The system 1300 can manage network operation data and management at a central level and have a centralized view of network use, aggregated and abstracted to the appropriate level.

FIG. 14 illustrates an example a sequence 1400 for a client to utilize the DNS to resolve and communicate with one or more nodes of the switchboard system. The illustrated sequence 1400 includes a client 1420, a DNS 1422, and a switchboard node 1424. At 1402, the sequence 1400 includes the client 1420 sending a request to a default DNS server for a text record switchboard. {domain}. {tld}. The text record may be preconfigured in a client app and/or a client SDK. At 1404, the DNS 1422 returns one or more records. A DNS record structure may include the following:

```
• Root Record:
  o Name: switchboard.{domain}.{tld}
  o Type: TXT
  o Resolution:
    • {nodename_1}.{operator_a}.{region_i}.switchboard.{domain}.{tld},
    • {nodename_2}.{operator_a}.{region_i}.switchboard.{domain}.{tld},
    • {nodename_1}.{operator_b}.{region_ii}.switchboard.{domain}.{tld},
    • {nodename_2}.{operator_b}.{region_ii}.switchboard.{domain}.{tld},
    • * etc.
  o Used For determining where there are active nodes
• Node Record:
  o Name: {nodename}.{operator}.{region}.switchboard.{domain}.{tld}
  o Type: A/AAAA or CNAME
  o Resolution: Actual node hostname or IP
  o Used For: communicating with a node 1424
```

In embodiments, the client 1420 may determine the current timezone at 1406. For example, the client app or the SDK may utilize a get current timezone function, such as in JavaScript: Intl.Date TimeFormat( ).resolvedOptions( ).timeZone). Embodiments are not limited in this manner, and the app or the SDK may determine the timezone via another/different function call. At 1408, the client 1420 is configured to map the timezone to a region or short-version identifier of the region. One example includes America/New_York→na-e. The region may be based on DNS names, for example. Table 2 illustrates a few examples of timezone mappings to regions:

TABLE 2

| Timezone | Region | Short Version |
|---|---|---|
| America/New_York | North America/East | na-e |
| America/Buenos_Aires | South America | sa |
| US/Pacific | North America/West | na-w |
| Europe/Paris | Europe | en |

Embodiments are not limited to these examples, and other timezone-to-region mappings may be utilized. Further and in embodiments, regions can also be represented as a bidirectional graph structure with the edges representing geographic neighbors. For example, na-e↔na-w and sa↔na-w and sa↔na-e. This representation is useful for node selection.

At 1410, the client 1420 may identify or select a DNS record option returned at 1404 that is in the region. If there are multiple matches, the client 1420 may select one at random. If there is no node available in the region, the client 1420 may determine and use a data graph of neighboring regions to select a node in the closest region where a node is available at 1412. For example, sa has no node but is connected to na-e where there is a node and so na-e is selected.

At 1414, the client 1420 may resolve a selected node's hostname. In embodiments, the client 1420 may automatically resolve the hostname using the client's HTTP request default resolver. At 1416, the DNS 1422 may return a result, and at 1418, the client 1420 may communicate with a switchboard node 1424 and begin the process to interact with the switchboard.

Figure 15A:
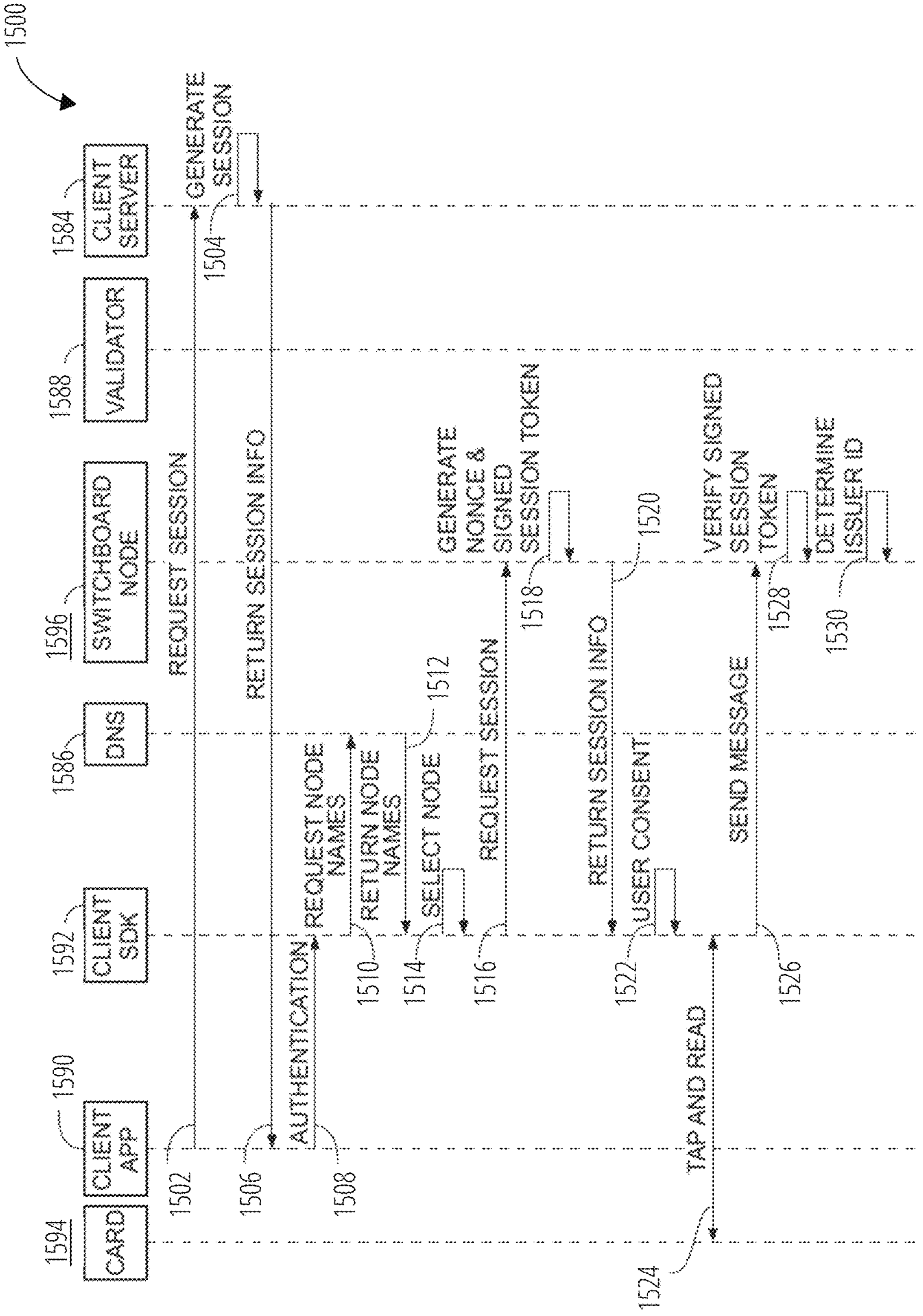
FIG. 15A illustrates an example of a sequence flow in accordance with one embodiment.
Figure 15B:
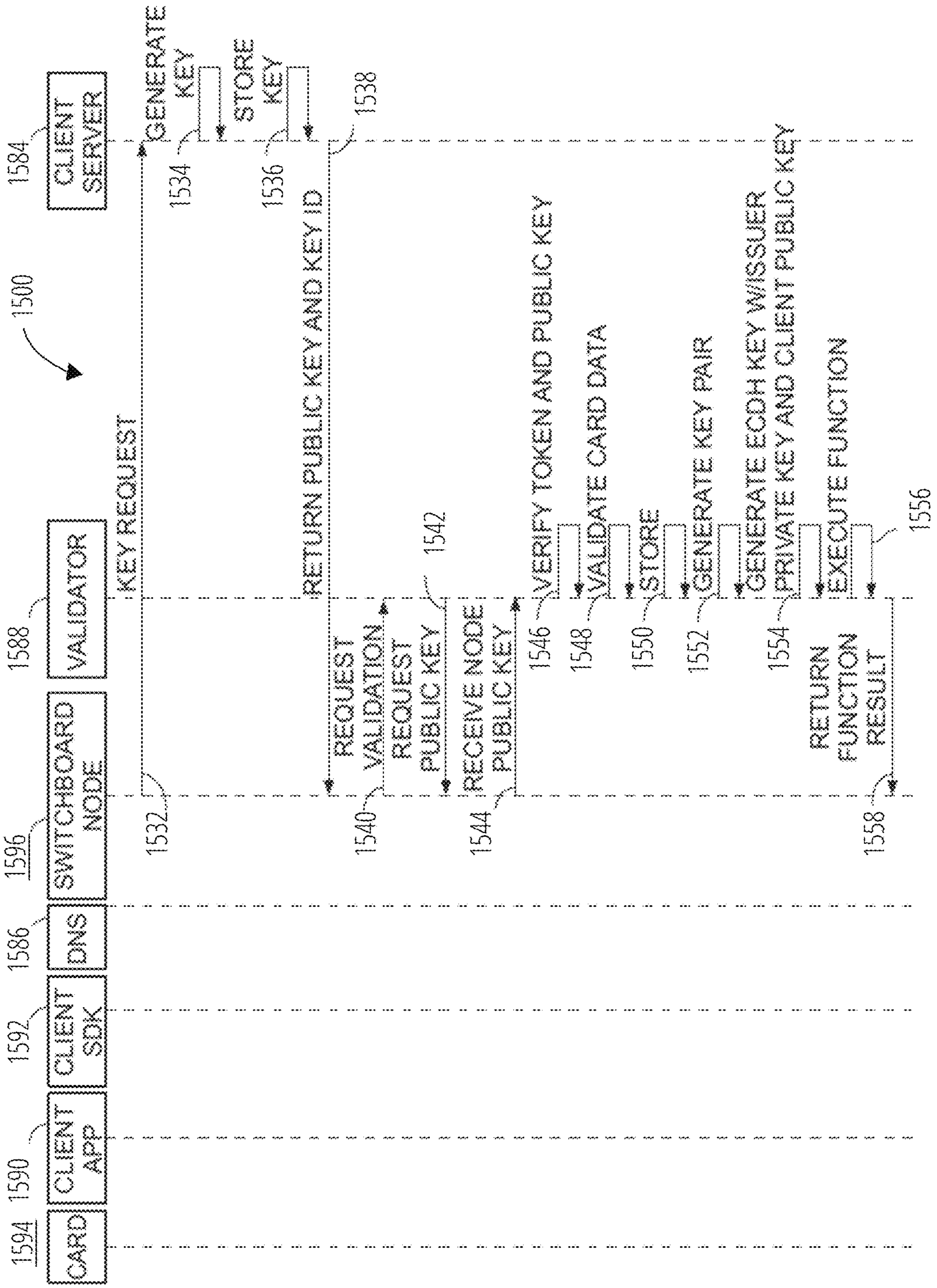
FIG. 15B illustrates an example of a sequence flow in accordance with one embodiment.
Figure 15C:
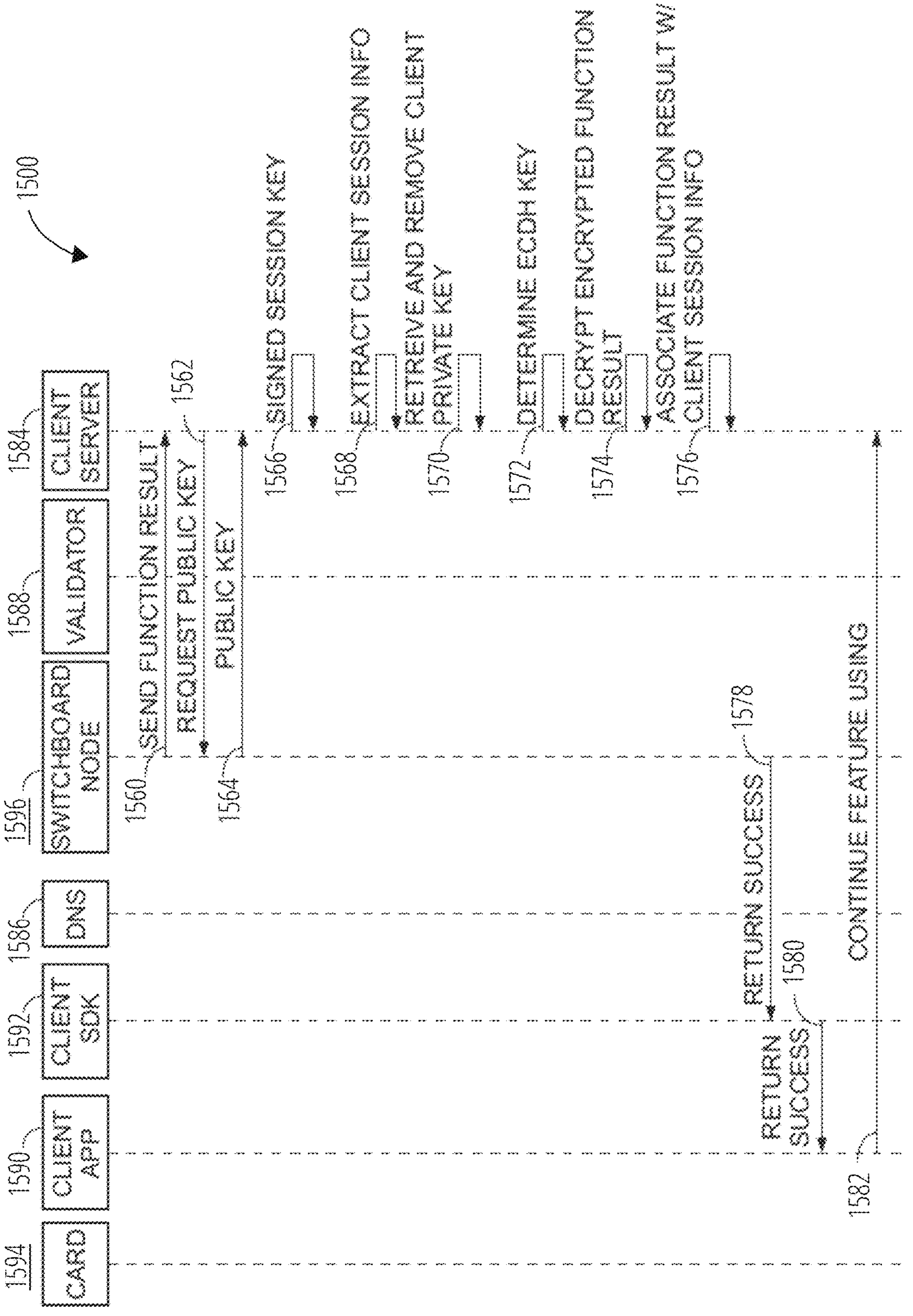
FIG. 15C illustrates an example of a sequence flow in accordance with one embodiment.

FIG. 15A-FIG. 15C illustrate an example of a sequence 1500 to perform operations between a contactless card and services provided by a card issuer and/or a merchant. The illustrated sequence 1500 includes actions and communications performed by a contactless card 1594, a client, including a client app 1590 and a client SDK 1592, a DNS 1586, a switchboard system including one or more nodes 1596, partner services, including a merchant and/or a validator 1588, and control services, including a client server 1584 or system. In embodiments, the client app 1590 may be any application configured to execute on the client, such as a banking app, a merchant app, a social media app, a travel app, a gaming app, a productivity app, an entertainment app, and so forth. In embodiments, the client app 1590 includes a web browser to provide websites and pages. The client app 1590 may include and/or utilize the client SDK 1592, which may be a set of instructions that enable the client app 1590 to communicate with other components of the switchboard system.

In embodiments and as shown in FIG. 15A, at 1502 the client, including the client app 1590, may send a request and establish a session with a client server 1584 such that a result may be associated with the correct client device or user. The request establishes a relationship between the client and the client server 1584, which may be an issuer server. At 1504, the client server 1584 generates a session and CLIENT SESSION INFORMATION. At 1506, the client server 1584 returns the session information, e.g., the CLIENT SESSION INFORMATION. In embodiments, the CLIENT SESSION INFORMATION may be client implementation-specific user session identification information.

At 1508, the client may initiate a contactless card authentication process with the client. For example, the client may call a function and/or pass information to the client to initiate authentication via a contactless card 1594. At 1510-1514, the client may utilize the DNS 1586 to identify a node and establish communication with the node. Specifically, at 1510, the client, including the client SDK 1592, may send a request for switchboard hostnames, and at 1512 the DNS 1586 may return information including one or more hostnames. At 1514, the client may determine a switchboard node to communicate. FIG. 14 illustrates an example of a more detailed sequence 1400 to establish communication with a switchboard node 1596.

At 1516, the client may send a request for a session to the switchboard system. In embodiments, the request for the session may be a function request in the format <FUNCTION REQUEST>. In embodiments, the FUNCTION REQUEST may be the data/function that the client would like to request once the contactless card 1594 has been validated. The function could be for any service discussed herein, e.g., authenticate the user, perform a transaction, request autofill data, etc. At 1518, the switchboard system may generate a nonce and a signed session token. The signed session token may be a JSON Web Token (JWT). When generating the JWT, the following elements should be set:

iss: The unique ID of the current node,
nonce: An 8 hex character, randomly generated nonce,
exp: The expiration timestamp (+5 minutes),
client_id: The requesting client's Client ID,
sub: The requesting client's Device Fingerprint,
sid: Arbitrary session info sent from the client,
scope: The function being requested to be performed.

The nonce may be unique, random bytes generated to ensure the unrepeatability of a message with the contactless card 1594. The nonce is critical to the security and operation of the switchboard system. The nonce validity is tracked by tying the nonce to a session that can be validated by any member of the platform. As mentioned, sessions are JSON Web Tokens signed using a node-specific private key issued by the network. These JWTs are verifiable by a system with the corresponding public key, which the system can also verify by confirming the JWT was issued by the network or an approved delegate. The signed session token is a JWT-generated token to establish the validity and expiration of the nonce and to associate the contactless card tap to the current client session. For example, the signed session token includes <NONCE>, <CLIENT SESSION INFO>, and <FUNCTION REQUEST> signed with <NODE PRIVATE KEY>, where the NODE PRIVATE KEY is the switchboard system private key. The switchboard system may include a NODE PUBLIC/PRIVATE KEY, which is a keypair used to sign and validate JWTs.

At 1520, the switchboard system may return session information to the client. The session information may include the signed session token (<SIGNED SESSION TOKEN>), the NONCE <NONCE>, the function terms of service <FUNCTION TOS>, and the terms of service version <TOS VERSION>. The FUNCTION TOS may be the terms of service that the user must consent to in order to allow the client to execute the requested function, and the TOS VERSION may be the version of the terms of service. At 1522, the client SDK 1592 may determine and/or receive user consent to the terms of service. In one example, the client SDK 1592 captures and records the user consent to <FUNCTION TOS> on <CONSENT DATE> with <TOS VERSION>. The CONSENT DATE may be the timestamp for the user's consent to the TOS.

At 1524, the client exchanges one or more messages with the contactless card 1594. In one example, the exchange may be based on the contactless card being tapped to a client device. In embodiments, the client SDK 1592 may provide data to the contactless card 1594 to use during the session to perform the function. The data may be provided to the contactless card 1594 in a near field data exchange (NDEF) message. In one example, the data is written to the card in NDEF format using a binary update command. The data may include a NONCE to provide a level of security that the message received from the card is part of the same session. Additionally, the data may include additional information, such as one or more control bits to control the format generated by the contactless card. Table 3 below illustrates an example of an NDEF message format.

TABLE 3

| Byte | Data Item | Value |
|---|---|---|
| 00 | NDEF Message Tag | D1 (only record) |
| 01 | Length of Record Type | 01 |
| 02 | Length of Record | 33 |
| 03 | text record type | 54 |
| 04 | Length of Language | 02 |
| 05-06 | Language | 65 6E ("en") |
| 07 . . . 0E | NONCE | 8 bytes of ASCII HEX encoded 4 bytes binary data |
| 0F . . . 12 | Session Indicators | 4 bytes of ASCII HEX encoded 2 bytes binary data |
| 13 . . . 16 | Control Indicators | 4 bytes of ASCII HEX encoded 2 bytes binary data |
| 17 . . . 26 | Update Date creation Time | 16 bytes of ASCII HEX encoded 8 bytes binary data-represents 64 bit unix timestamp |
| 27 . . . 36 | Update MAC | MAC to protect control indicators-16 bytes of ASCII HEX encoded 8 bytes binary data |

The updated MAC may be calculated to protect the control indicators in embodiments. Specifically, The MAC M is determined by calculating a MAC over the 10 bytes of the update data U with the Update MAC Card Key (MCK), as described in FIG. 16.

At 1524, the contactless card 1594 may generate and provide a message to the client's device, including the client SDK 1592. The data in the message may be utilized by the system discussed herein to perform the function requested. One example of the message is illustrated and discussed in FIG. 16.

At 1526, the client, including the client SDK 1592, may send a message and information to the switchboard system. The message may be the message received from the contactless card 1594, e.g., message 1600 in FIG. 16. In addition, the client SDK 1592 may send the consent date, the TOS version, and the signed session token to the switchboard system. The switchboard system may utilize the information to ensure the session is valid. At 1528, the switchboard system verifies the signed session token is valid, e.g., is the previously provided signed session token and includes the nonce previously generated and in the message.

In some embodiments, the switchboard system is configured to determine which issuer system or client-server it should route the message to for processing. At 1530, the switchboard system may determine the issuer ID by extracting the issuer ID from the message received from the contactless card 1594 via the client SDK 1592. As mentioned, the issuer ID identifies the issuer of the contactless card 1594.

FIG. 15B continues the sequence 1500 from FIG. 15A. In embodiments, the switchboard system is configured to generate and communicate secure communications with the issuer system, e.g., the client server 1584 and the validator 1588. At 1532, the switchboard system sends a request for a key to the client server 1584. The key may be utilized to perform secure communications. In one example, the key request may be an elliptical curve Diffie-Hellman (ECDH) key request. Embodiments are not limited in this manner. Alternative key protocols may be utilized, e.g., Supersingular isogeny Diffie-Hellman key exchange (SIDH or SIKE), a private/public key pairing (RSA), etc.

At 1534, the client server 1584 generates a portion of the key. In some instances, the client server 1584 may generate half of the ECDH key for encryption/decryption of PII. Specifically, the client server 1584 may generate <CLIENT EC PUBLIC KEY> and <CLIENT EC PRIVATE KEY> using Elliptic Curve P256. The CLIENT EC PUBLIC KEY AND CLIENT EC PRIVATE KEY is the first half of the ECDH key negotiation.

At 1536, the client-server 1584 stores the generated portion of the key in storage. Specifically, the client server 1584 may store <CLIENT EC PUBLIC KEY> and <CLIENT EC PRIVATE KEY> with <KEY ID>, where the KEY ID is used by the Client Server to cache its short-lived EC public/private key for later ECDH key completion, e.g., to identify the ECDH key portions to generate the whole ECDH key. In one example, the key may be stored in a secure memory location and may be used to when PII is received for the session.

In embodiments, the client server 1584 may return the public key portion to the switchboard system with the KEY ID at 1538. The switchboard system may store the public key portion with the KEY ID for later use, e.g., generation of the ECDH key. At 1540, the switchboard system may request a validation to be performed by the validator 1588. In one example, the switchboard system may send a request validation as Request Validation <MESSAGE>, <SIGNED SESSION TOKEN>, <CLIENT EC PUBLIC KEY>, <CONSENT DATE>, and the <TOS VERSION>. The validator 1588 may make an out-of-band request back to the switchboard system for the public key to verify the session at 1542. At 1544, the switchboard system may provide the node's public key, i.e., <NODE PUBLIC KEY>. Further at 1546, the validator 1588 may utilize the node's public key to verify the secure session token.

Figure 17:
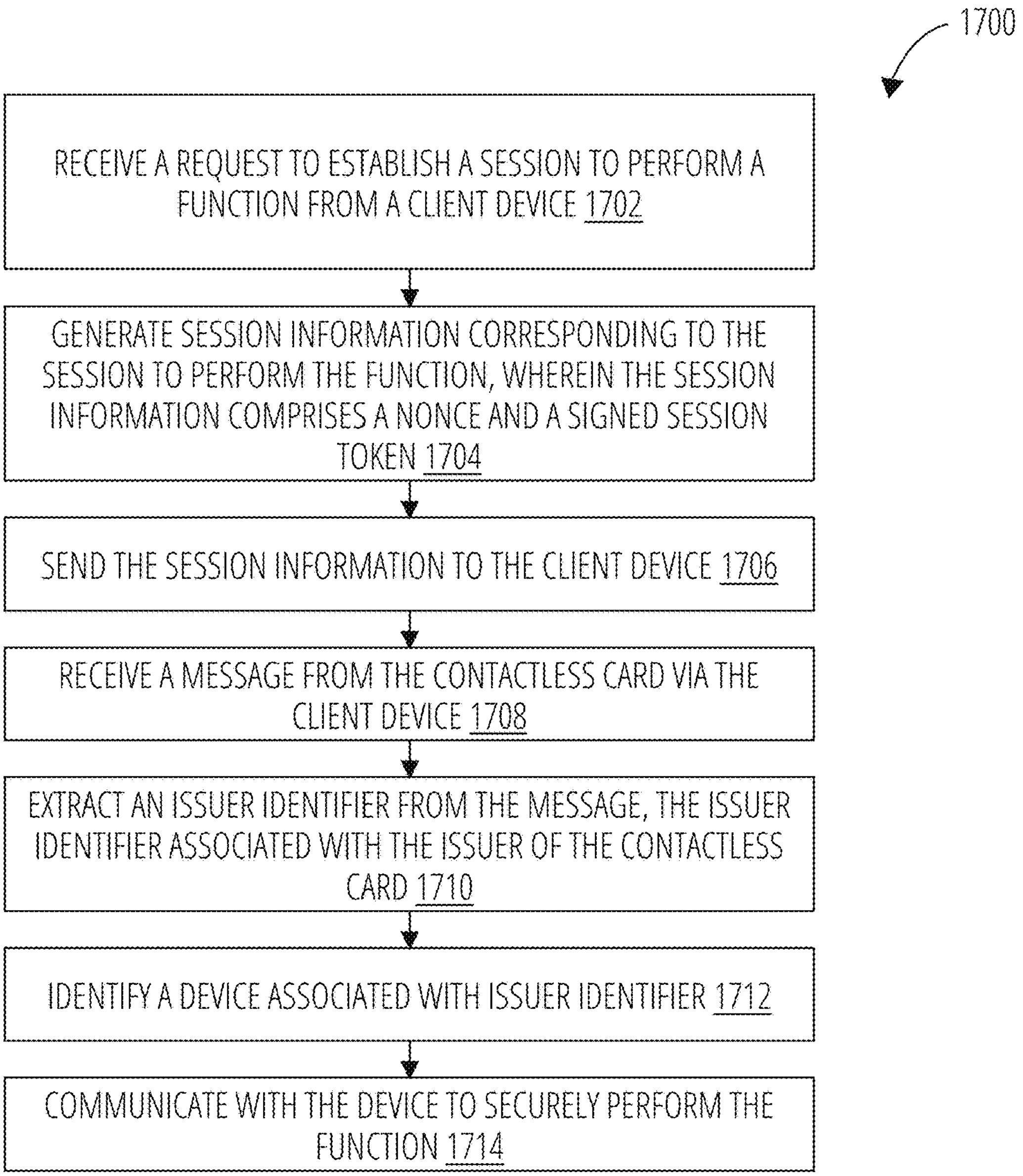
FIG. 17 illustrates an example of a method in accordance with one embodiment.

In embodiments, the validator 1588 may validate the message at 1548. In embodiments, the validator 1588 may perform a number of validations including ensuring the nonce in the message is correct along with additional information, such as the card's unique identifier (pUID), and the counter value (pATC). FIGS. 15-17 discuss additional details of a validation process that may be performed.

At 1550, the validator 1588 may store information associated with the session. For example, the validator 1588 may store the <CONSENT DATE> with the <TOS VERSION> and the <PUID>. The validator 1588 may also generate another portion of the key, e.g., the ECDH key. For example, the 1588 may Generate <ISSUER EC PUBLIC KEY> and <ISSUER EC PRIVATE KEY> using Elliptic Curve P256. The ISSUER EC PUBLIC KEY and ISSUER EC PRIVATE KEY may be the second half of the ECDH key negotiation.

At 1554, the validator 1588 may generate the complete ECDH key. For example, the validator 1588 generates the <ECDH KEY> from <ISSUER EC PRIVATE KEY> and <CLIENT EC PUBLIC KEY>. The ECDH KEY is the final key generated using ECDH key negotiation.

The validator 1588 may utilize the ECDH KEY to encrypt data for the function. For example, if the validator 1588 validates the message in some instances, the validator 1588 may execute a function request to create a function result and encrypt the result with the ECDH KEY at 1556. For example, the validator 1588 may execute <FUNCTION REQUEST> to create <FUNCTION RESULT> and encrypt the same with the <ECDH KEY>. The function result may be any result based on the requested function, e.g., verification of the card.

At 1558, the validator 1588 may return the function result to the switchboard system. In some instances, the function result is returned encrypted. For example, the validator 1588 may return the <ENCRYPTED FUNCTION RESULT> and the <ISSUER EC PUBLIC KEY>.

FIG. 15C continues the sequence 1500 from FIG. 15B. In embodiments, at 1560, the switchboard system sends the function result to the client server 1584 to process the result. In one example, the switchboard system may send the <ENCRYPTED FUNCTION RESULT>, <KEY ID>, <ISSUER EC PUBLIC KEY>, and <SIGNED SESSION TOKEN>. At 1562 and 1564, the client server 1584 may make a request for and receive the public key from the switchboard system. In some instances, the exchange may be performed via out-of-band communication channels. The public key for the node may be <NODE PUBLIC KEY>. The public key may be used to verify the sender of the function result, etc. At 1566, the client server 1584 may verify the signed session key with the node's public key <NODE PUBLIC KEY> to verify the sender of the information. At 1568, the client server 1584 may extract client information from the signed session token. For example, the client server 1584 may Extract <CLIENT SESSION INFO> from <SIGNED SESSION TOKEN>, i.e., extracting the client implementation-specific user session identification information.

Further, at 1570, the client server 1584 may retrieve the client's private key with the KEY ID. Specifically, the client server 1584 may get and remove the <CLIENT PRIVATE KEY> from a cache using the <KEY ID>. At 1572, the client server 1584 may generate or compute the ECDH key. For example, the client server 1584 may compute the <ECDH KEY> with the <CLIENT PRIVATE KEY>+<ISSUER EC PUBLIC KEY>. The client server 1584 may decrypt the function result with the computed key at 1574. Specifically, the client server 1584 may decrypt the <ENCRYPTED FUNCTION RESULT> with the <ECDH KEY> to determine the <FUNCTION RESULT>. At 1576, the client server 1584 associates the function result with the session.

In embodiments, the switchboard system may return whether the function result was successfully completed or not at 1578 to the client SDK 1592. Further at 1580, the client SDK 1592 may notify the client app 1590 of the result. At 1582, the client app 1590 may utilize the feature. For example, the 1582 may communicate with the client server 1584 to continue the feature using the <CLIENT SESSION INFO> to fetch the redacted <FUNCTION RESULT>.

FIG. 16 illustrates an example of a message 1600 that may be communicated by a contactless card to perform the functions described herein, such as those discussed in FIG.

3A-3C. One or more of the fields in the message 1600 may also be utilized to route the message 1600 through the switchboard system and perform authentication/validation techniques.

In embodiments, the message 1600 includes an applet version 1602 field, an issuer discretionary indicator 1604 field, an Issuer Identifier 1606 field, a pKey ID 1608 field, a pUID 1610 field, a pATC 1612 field, a nonce 1614 field, and an encrypted cryptogram 1616.

In embodiments, the fields may be in plain text or encrypted. For example, the applet version 1602 field may include an applet version in plain text. The applet version indicates which applet version is installed on a contactless card and may be used by the other systems to determine how to process the message 1600 when communicated. For example, different Applet versions require different validation logic, e.g., an older message may be routed through the issuer system to perform various operations for validation, while a newer message may be routed through the switchboard system to perform the various operations, including validation.

In embodiments, the message 1600 includes an issuer discretionary indicator 1604 field that may include issuer data and be set at the time of personalization. In addition, the message 1600 includes an issuer identifier 1606 field that may include a unique ID assigned to the entity issuing the card, e.g., the issuer. For example, when joining the system, each issuer may be assigned a unique identifier during an onboarding operation. The issuer ID can be used by the switchboard system to route a message and its contents to the appropriate services that are associated with that particular issuer.

In embodiments, the message 1600 includes a pKey ID 1608 field. In some instances, the pKey ID 1608 field may include data that identifies a set of master keys for a card issuer. The issuer's set of master keys may utilize each card's set of derived master keys or unique derived keys (UDK). Further, each card's own set of master keys (UDKs) may be generated during the personalization of the card. The card's UDKs may be utilized to generate session keys that are used to generate the application cryptogram. The session keys generated by a card may be regenerated by a system, e.g., the validator system, utilizing pKeyID to identify the issuer's master keys to regenerate session keys by the system to perform a validation.

In embodiments, each contactless card is given a unique 16-decimal digit identity (pUID) at the time of personalization. Derivation of the card applet's unique keys using the pUID is performed off-card. The resultant application keys are injected during the personalization of the card. In embodiments, a card's application keys are the same as the card's derived master keys or UDKs.

The message 1600 may include a pUID 1610 field, including a card unique identifier assigned to the contactless card at personalization time. The pUID 1610 field data may be a combination of alphanumeric characters used to identify each card and associated with a user uniquely.

In embodiments, the message 1600 includes a pATC 1612 field configured to hold a counter value. The counter value keeps a count of reads (taps) made on the contactless card in a hexadecimal format in one example. Further, a counter value may be used to generate session keys to encrypt at least a portion of a message.

In embodiments, each time a message 1600 is created, a new session key is derived and utilized to generate one or more portions of the message 1600. Specifically, a session key is used to calculate the cryptographic MAC (Application Cryptogram). The card's applet supports a session key derivation option to generate a unique authentication session key (ASK) and a unique data encipherment session key (DESK).

In embodiments, a portion of the data provided in message 1600 is static and set on the card during the personalization of the card and other data is dynamic and may be generated by the card during an operation, e.g., when a read operation is being performed. Note that in some instances, the static information may be updateable, but may require the customer and card to go through a secure update process, which may be controlled by the issuer.

In embodiments, the contactless card may communicate a message between a device, such as a mobile device, during a read operation. For example, in response to the contactless card being tapped onto a surface of the device, e.g., brought within wireless communication range, a read operation may be performed on the contactless card, and the contactless card may generate and provide the message to the device. For example, once within range, the contactless card and the device may perform one or more exchanges for the contactless car to send the message to the device.

The wireless communication may be in accordance with a wireless protocol, such as NFC, Bluetooth, WiFi, and the like. In some instances, a message may be communicated between a contactless card and a device via wired means, e.g., via the contact pad, and in accordance with the EMV protocol.

As discussed above, the contactless card may be deployed with a unique card key, e.g., the UDK, that is generated from an issuer's master key and is used to generate session keys. The following discusses the generation of the UDK and the session keys (ASK and DESK). Further, the contactless card may generate encrypted data or a cryptogram comprising data as discussed herein with the generated keys. The encrypted data may be encrypted with session keys that are changed each time data is encrypted. In one embodiment, the session keys are generated from card master keys or unique diversified keys that are stored on the contactless card. The unique diversified keys may be generated from the issuer's master keys. For example, in some instances, operations to generate the unique diversified keys may be performed off the card at personalization time and then stored in the memory of the card. Further, the issuer's master key(s) may be utilized to generate card master keys. The card master keys may also be known as application keys or UDKs. Each contactless card may have one or more UDKs.

In embodiments, each contactless card includes one or more applications, such as an authentication application, that is given a unique 16-digit identity (pUID) at time of personalization. Each contactless card may also receive application keys, which may also be known as UDKs or card master keys using the pUID. In some instances, these operations are performed off-card, and the resultant keys are injected during personalization. However, in other instances, one or more of the operations may be performed on the card, e.g., at the time of manufacture, each time an operation is performed with a key, and so forth.

Embodiments include a system configured to generate a number of issuer master key sets and assign each a unique three-byte pKey identifier (pKey ID). As mentioned, systems discussed herein may support many card issuers, and each card issuer may have one or more of its own sets of unique issuer master keys that can be identified with a pKey ID. For each application, such as the authentication application, the system may perform the following operations to generate application keys or UDKs.

In embodiments, the system assigns a pKey ID or a pUID, a card application's unique 16-decimal digital identity, to a card. The system initiates generating a card's UDK(s). Specifically, the system generates a 16-digit quantity (X) from the 16-digit pUID. In one example, the 16-digit X may be generated by randomly rearranging the 16-digit pUID. In another example, X may be the same as the 16-digit pUID. Embodiments are not limited in this manner, and other techniques may be utilized to generate X from the 16-digit pUID. In embodiments, the 16-digit quantity X may be utilized to generate one or more UDKs.

In instances, the system computes or calculates a first portion (ZL) by encrypting X with an issuer master key. An encryption algorithm, such as DES or DES variant, may be utilized in embodiments. Embodiments are not limited in this manner, and other examples of encryption algorithms include AES and public-key algorithms, such as (RSA).

The system calculates or computes a second portion ZR by exclusively or'ing (XOR'ing) X with FFFFFFFFFFFFFFFF and encrypting the result with an issuer master key. Again, an encryption algorithm such as DES, AES, RSA, etc., may be used to encrypt the result of the XOR'ing. The system generates an application key or UDK. Specifically, the system concatenates ZL with ZR to form the application key. Embodiments are not limited to concatenating the two portions (ZL and ZR). They may be combined using other techniques. Additionally, the above-described process can be performed any number of times to generate additional application keys, e.g., by utilizing different master issuer keys. In embodiments, a contactless card stores the generated application key(s) or UDK(s).

In embodiments, the contactless card utilizes the application key(s) or UDK(s) to generate session keys for each encrypted data is generated. The following is one processing flow that may be performed by the contactless to generate a unique cryptogram session key (ASK).

To generate the ASK, the contactless card computes an SKL by encrypting [ATC[2]||ATC[3]||'F0'||'00'||[ATC[0]||[ATC[1]||[ATC[2]||[ATC[3] with an application key. Further, the contactless card computes SKR by encrypting [ATC[2]||ATC[3]||'0F'||'00'||[ATC[0]||[ATC[1]||[ATC[2]||[ATC[3]] with the application key. Finally, the contactless card concatenates SKL with SKR to form an ASK. In embodiments, the ASK is used to perform operations utilizing the contactless card, such as encrypting the cryptographic MAC.

In embodiments, the contactless card also supports session key derivation to generate a unique encipherment session key DESK. The contactless card computes an SKL by encrypting [ATC[2]||ATC[3]||'F0'||'00'||'00'||'00'||'00'||'00'] with a Data Encryption Key (DEK) or UDK. Further, the contactless card computes SKR by encrypting [ATC[2]||ATC[3]||'0F'||'00'||'00||'00'||'00'||'00'] with the DEK or UDK. The contactless card concatenates SKL with SKR to form the DESK.

In embodiments, the contactless card generates encrypted data or a cryptogram utilizing the session keys. Specifically, the contactless card generates a cryptogram C by calculating a MAC over the 32-byte transaction data T using the Authentication Session Key (ASK).

The contactless card may process the data to generate the cryptogram. Specifically, the contactless card divides T into four blocks of 8 bytes of data: T=T1||T2||T3||T4. The contactless card computes B=DES(ASKL)[T1], where DES is the Data Encryption Standard or another symmetric encryption algorithm and ASKL is a portion of the ASK, e.g., the "left" half of the key. The contactless card computes B=[B XOR T2], and the contactless card computes B=DES(ASKL)[B]. The contactless card computes B=[B XOR T3], and the contactless card computes B=DES(ASKL)[B]. The contactless card computes B=[B XOR T4], and the contactless card computes B=DES(ASKL)[B]. The contactless card computes B=$DES^{-1}$(ASKR)[B], where $DES^{-1}$ is the reciprocal DES operation and ASKR is a portion of the ASK, e.g., the right half. The contactless card computes the cryptogram C=DES(ASKL)[B].

In embodiments, the contactless card may also encipher the cryptogram to secure the data further. For example, the contactless card may generate an 8-byte random number [RND] and the card computes E1=DES3(DESK)[RND], where DES3 is a symmetric encryption algorithm such as the Triple Data Encryption Standard. The contactless card then computes B=[E1] XOR [C], where C is the cryptogram generated as discussed above. The contactless card computes E2=DES3(DESK)[B], where B is computed above. Further, the contactless card generates the 16-byte enciphered payload E=[E1]||[E2].

In embodiments, a device or the contactless card may decrypt the payload E by determining, receiving, or retrieving the payload E. The device computes a RND=$DES3^{-1}$(DESK) [E1]. The device determines B=$DES3^{-1}$(DESK) [E2], and the device computes C=[E1] XOR [B].

In embodiments, the contactless card generates or calculates a message authentication code (MAC). In some instances, the MAC may be an updated MAC. In embodiments, the updated MAC is included in data communicated from the contactless card to another device, such as a mobile device, a point-of-sale (POS) terminal, or any other type of computer. In one example, the updated MAC may be included in an NDEF message.

In embodiments, the updated MAC may be calculated to protect the control indicators and include an updated date/time. For example, the updated MAC M is determined by calculating a MAC over the 10 bytes of the updated data U with the Updated MAC Card Key (MCK) as follows.

Embodiments include determining data to process through a number of calculations and computations. In one example, the data U equals the [Control Indicators (2 bytes)||Update Date Time (8 bytes)||'80'||'00 00 00 00 00']. For the calculations, the data may be divided into two separate portions. Specifically, the data U is broken into two blocks of 8 bytes of data, where $U=U_1||U_2$. Further, operations may be performed on $U_1$ and $U_2$.

Embodiments include applying an algorithm to the first portion ($U_1$) of the data. In one example, a result B may be computed where B=DES(MCKL) [$U_1$], where DES is a Data Encryption Standard algorithm using a first portion (L) of the MAC Card Key (MCKL).

Further, an additional operation may be performed on the result B. Specifically, the result B may be XOR'd with a second portion of the data ($U_2$).

The updated result B may be further processed. For example, result B may be further processed by applying the DES algorithm using MCKL again to B. The result, the inverse DES, may process B with a second portion (R) of the MCK (MCKR), and the MAC M may be determined by applying the DES algorithm with the MCKL to result B.

FIG. 17 illustrates an example of method 1700 in accordance with embodiments discussed herein. In block 1702, the method 1700 includes receiving, by a node in a system, a request to establish a session to perform a function from a client device, wherein the function is at least partially performed utilizing a contactless card, such as the contactless card. In some instances, the node may be one of a plurality nodes of a switchboard system. The node may be previously selected by the sending device via a DNS operation performed.

In block 1704, the method 1700 includes generating, by the node, session information corresponding to the session to perform the function, wherein the session information comprises a nonce and a signed session token. The nonce and/or the signed session token may be utilized by systems to perform the functions described herein while ensuring the node routing the data is authenticated, the message from the contactless card is authenticated, and to keep track of the session for the function.

In block 1706, the method 1700 includes sending the session information to the client device by the node. The client device may communicate with a contactless card to receive data from the card to authenticate and perform a function. In some instances, the client device may send the nonce from the node to the contactless card. The contactless card may utilize the nonce when generating the message to communicate back to the client device. Finally, the node incorporates the nonce into a cryptographic portion of the message (see, e.g., FIG. 4).

In block 1708, the method 1700 includes receiving, by the node, a message from the contactless card via the client device. The message may be generated by the contactless card. FIG. 16 illustrates one example of a message 1600. In some embodiments, the node verifies the message. For example, the node may verify a nonce in the message and a signed session token.

In block 1710, the method 1700 extracts an issuer identifier from the message by the node, where the issuer identifier is associated with the issuer of the contactless card. In some instances, the issuer identifier may be in a plaintext format.

In block 1712, the method 1700 identifies, by the node, a device associated with the issuer identifier. For example, the node may perform a lookup to determine a server associated with the issuer identifier and the function to be performed.

In block 1714, the method 1700 communicates, by the node, with the device to securely perform the function.

Figure 18:
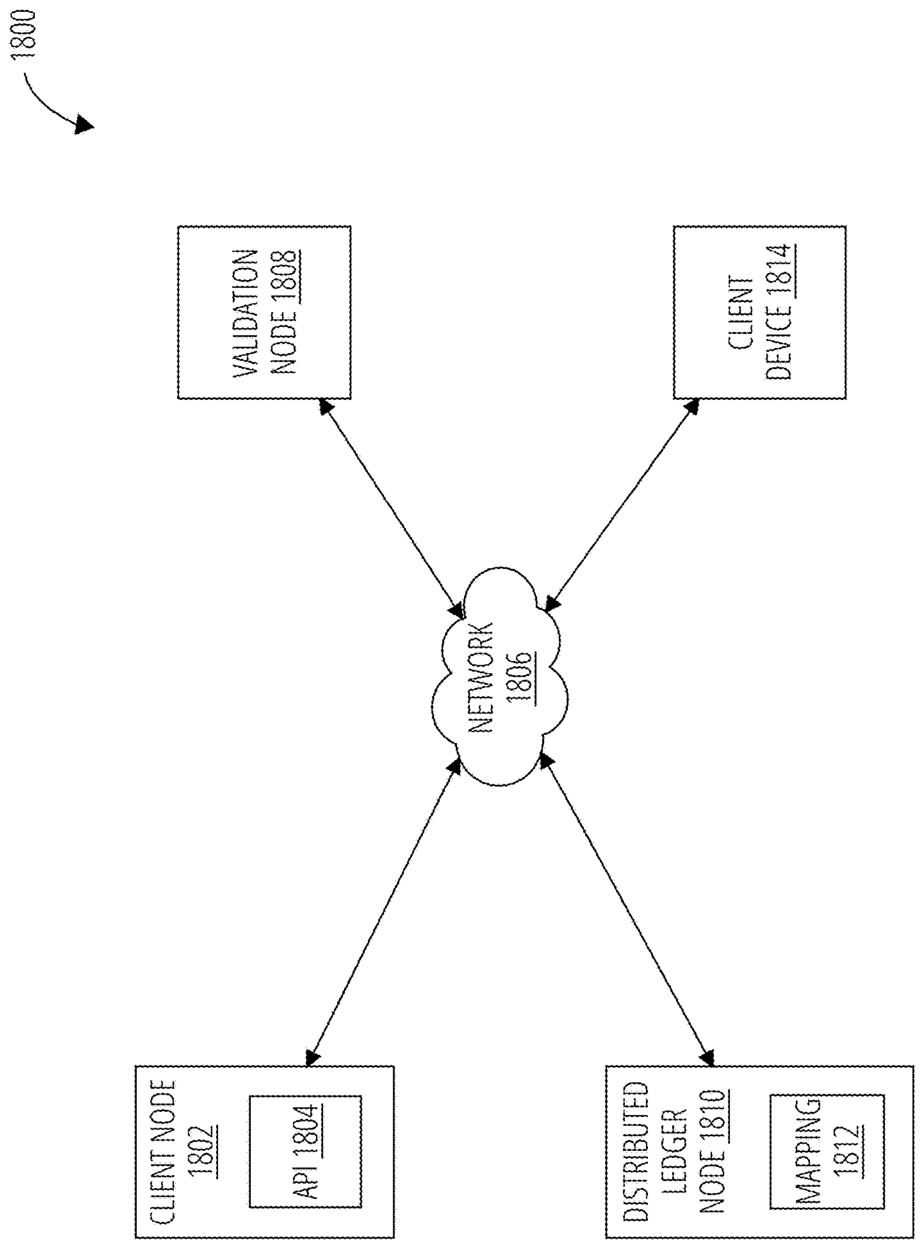
FIG. 18 illustrates an example of a distributed network authentication system in accordance with one embodiment.

FIG. 18 illustrates a distributed network authentication system 1800 according to an example embodiment. As further discussed below, the system 1800 can include a client node 1802, an API 1804, a network 1806, a distributed ledger node 1810, mapping 1812, and a client device 1814. Although FIG. 18 illustrates single instances of the components, the system 1800 can include any number of components.

The system 1800 can include the client node 1802, which can be a network-enabled computer as described herein. In some examples, the client node 1802 can be a server, which can be a dedicated server computer or a bladed server, or can be a personal computer, a laptop computer, a notebook computer, a palm top computer, a network computer, a mobile device, a wearable device, or any processor-controlled device capable of supporting the system 1800.

In some examples, the client node 1802 can execute one or more applications, such as software applications, that enable, for example, network communications with one or more components of the system 1800, transmit and/or receive data, and perform the functions and processes described herein.

The client node 1802 can contain the API 1804. For example, various different APIs can be provided for an application (e.g., executed on a computing device, such as a network-enabled computer) that can interact with a service. For example, an application executed on a device (e.g., a smart phone, smart watch, tablet, laptop, or other device) can interact with a web-based service by calling the API 1804 to interact with the service, such as by performing a remote call to an API for interacting with a web-based service.

The API 1804 can be provided in the form of a library that includes specifications for routines, data structures, object classes, and variables. In some cases, such as for representational state transfer (REST) services, an API (e.g., a REST API or RESTful API, or an API that embodies some RESTful practices) is a specification of remote calls exposed to the API consumers (e.g., applications executed on a client computing device can be consumers of a REST API by performing remote calls to the REST API). REST services generally refer to a software architecture for coordinating components, connectors, and/or other elements, within a distributed system (e.g., a distributed hypermedia system).

The client node 1802 can communicate with one or more other components of the system 1800 either directly or via the network 1806. The network 1806 can comprise one or more of a wireless network, a wired network, or any combination of a wireless network and a wired network and may be configured to connect the components of the system 1800. While FIG. 18 illustrates communication between the components of the system 1800 through the network 1806, it is understood that any component of the system 1800 can communicate directly with another component of the system 1800, e.g., without involving the network 1806.

The system 1800 can include a validation node 1808, which can be a network-enabled computer as described herein. In some examples, the validation node 1808 can be a server, which can be a dedicated server computer or a bladed server, or can be a personal computer, a laptop computer, a notebook computer, a palm top computer, a network computer, a mobile device, a wearable device, or any processor-controlled device capable of supporting the system 1800.

In some examples, the validation node 1808 can execute one or more applications, such as software applications, that enable, for example, network communications with one or more components of the system 1800, transmit and/or receive data, and perform the functions and processes described herein.

In some examples, each validation node can be associated with a routing number, and the routing number identifies the entity controlling the keys for the authentication namespace. The authentication namespace can be related to one or more of a particular entity, a particular set of cards, or a particular set of security keys (e.g., master keys, diversified keys, session keys) associated with an entity, a set of cards, or a type of cards.

The system 1800 can include the distributed ledger node 1810, which can be a network-enabled computer as described herein. In some examples, the distributed ledger node 1810 can be a server, which can be a dedicated server computer or a bladed server, or can be a personal computer, a laptop computer, a notebook computer, a palm top computer, a network computer, a mobile device, a wearable device, or any processor-controlled device capable of supporting the system 1800.

In some examples, the distributed ledger node 1810 can execute one or more applications, such as software applications, that enable, for example, network communications with one or more components of system 1800, transmit and/or receive data, and perform the functions and processes described herein.

The distributed ledger node 1810 can containing the mapping 1812. In some examples, the mapping 1812 can be in the form of one or more databases. Exemplary databases can include, without limitation, relational databases, non-relational databases, hierarchical databases, object-oriented databases, network databases, and any combination thereof. The one or more databases can be centralized or distributed. The one or more databases can be hosted internally by any component of the system 1800, or the one or more databases can be hosted externally to any component of the system 1800. In some examples, the one or more databases can be contained in the distributed ledger node 1810, and in other examples the one or more databases can be stored outside of distributed ledger node 1810 but in data communication with the distributed ledger node 1810. The one or more databases can be implemented in a database programming language. Exemplary database programming languages include, without limitation, Structured Query Language (SQL), MySQL, HyperText Markup Language, JavaScript, Hypertext Preprocessor Language, Practical Extraction and Report Language, Extensible Markup Language, and Common Gateway Interface. Queries made to the one or more databases can be implemented in the same database programming language used to implement the one or more databases. For example, if the one or more databases are an SQL database, then queries made to the database can be made in SQL (e.g., SELECT column1, column2 FROM table1, table2 WHERE column2='value'). It is understood that the one or more databases can be implemented in any database programming language and that the programming implementation of the query can be adjusted as necessary for compatibility with the one or more databases and to reflect the particular information to be queried.

In some examples, the one or more databases can be contained within the distributed ledger node 1810. In other examples, the one or more databases can be remote from distributed ledger node 1810 but in data communication with the distributed ledger node 1810. Data communication between the one or more databases and the distributed ledger node 1810 can be a direct data communication or data communication via a network, such as the network 1806.

In some examples, the client node 1802 can be in data communication with the distributed ledger node 1810. The distributed ledger node 1810 can contain the mapping 1812, and the mapping 1812 may include, for example, a mapping between a validation node address and the validation node 1808, a mapping between a routing number and a validation node address, and/or a mapping between a routing number and the validation node 1808. In some examples, the mapping 1812 can include a digital signature associated with an entity having permission to validate for a routing number. Based on one or more of these associations, the client node 1802 can call the validation node 1808 for validation and/or provide direction to the client device to reach the appropriate validation node. This can be accomplished by calling a validation API associated with the validation node 1808.

In some examples, iterations of the mappings described herein, such as the mapping 1812, can also include a software or applet version number. The version number can be used to identify a validation node or validation node address or choose between multiple validation addresses for one validation node.

In some examples, the client node 1802 and the distributed ledger node 1810 can be permissioned (e.g., allowed to join a network) with the aid of a certificate and/or a cryptographic authentication mechanism (e.g., a non-fungible token). The certificate and/or a cryptographic authentication mechanism may be issued by, e.g., a consortium authority or other administrative entity associated with the distributed network. If granted appropriate permissions, the distributed ledger node 1810 can update the mapping 1812 to reflect a different association between, for example, a routing number, a validation node address, and a validation node. In some examples, degrees of permissions can be issued. For example, if the client node 1802 were to function to route data to the validation node 1808 (or other validation nodes), then the client node 1802 can be given a certain level of permissions. As another example, if the distributed ledger node 1810 were to have the capability to update the mapping 1812, then the distributed ledger node 1810 can have a different, higher level of permissions.

The system 1800 can include the client device 1814, which can be a network-enabled computer as described herein. In some examples, the client device 1814 can be a server, which can be a dedicated server computer or a bladed server, or can be a personal computer, a laptop computer, a notebook computer, a palm top computer, a network computer, a mobile device, a wearable device, or any processor-controlled device capable of supporting the system 1800. The client device 1814 can also be a mobile device; for example, a mobile device may include an iPhone, iPod, or iPad from Apple®, any other mobile device running Apple's iOS® operating system, any device running Microsoft's Windows® Mobile operating system, any device running Google's Android® operating system, and/or any other smartphone, tablet, or like wearable mobile device. In some examples, the client device 1814 can be in data communication with another network-enabled computer not shown in FIG. 18, such as a smart card (e.g., a contactless card or a contact-based card).

In some examples, the client device 1814 can execute one or more applications, such as software applications, that enable, for example, network communications with one or more components of the system 1800, transmit and/or receive data, and perform the functions and processes described herein.

In some examples, upon receipt of an authentication request, the client device 1814 can call (e.g., via an API) the client node 1802. The call can include a routing number and/or an applet or software version number, and the client node 1802 can query distributed ledger node 1810 and the mapping 1812. Once the query returns the identification of a validation node (e.g., the validation node 1808) and/or a validation node address associated with that routing number and/or applet or software version, the client node 1802 can reply to the client device 1814. The client device 1814 can then proceed with authentication with the validation node. The authentication can be performed by, for example, the systems and methods described herein, such as by generation, encryption, transmission, decryption, and validation of a cryptogram as described herein.

In some examples, the client node 1802 can be co-resident with the validation node 1808. In these examples, the client node 1802 can handle the authentication in a single call from the client device 1814. In some examples, this can be acceptable only if it is permissible for the full authentication transmission (e.g., a cryptogram as described herein) to be sent to client nodes that are not involved in authentication.

In some examples, if the client node 1802 receives, from the client device 1814, a routing number that is not handled by its location, the client node 1802 can return a code indicating that this routing number is not handled, along with validation node address for the responsible validation node. The client device 1814 can then send the full authentication transmission to the validation node 1808 using the received validation node address.

In some examples, the client node 1802 can enter the distributed network with different permissions. For example, the client node 1802 can be a read-only router of data. As another example, the client node 1802 can have permission to send messages to the distributed ledger node 1810 updating one or more routing paths for one or more routing numbers. However, the client node 1802 would be prevented from updating one or more routing paths for one or more routing numbers for other entities that control other routing numbers that are not associated with the client node 1802 or that did not grant this permission. As another example, the distributed ledger node 1810 can contain contracts and/or records that can validate the permission of a specific entity to change a specific routing record based on its digital signature. As another example, the consortium authority or other administrative entity controlling the distributed network can have additional privileges to, without limitation, add new members (e.g., client nodes, distributed ledger nodes, validation nodes, and/or client devices), add new signature credentials, add new keys, add new certifications, and also revoke any of the foregoing. In some examples, the foregoing permissions can be delegated to the client node 1802, the distributed ledger node 1810, and/or the validation node 1808 if security, legal, and/or financial conditions are met. However, delegation is not required.

In some examples, one or more APIs can facilitate communication between components of the system 1800 via the network 1806. In other examples, one or more APIs are not required. Rather, the components of system 1800 could be in direct communication and/or dedicated to one or more specified entities to allow the specified entities to keep data from being transferred to, transferred from, or transferred via non-specified entities. This may further promote data security and avoid detection of data traffic patterns by non-specified entities.

In some examples, entities could establish a standard for nodes having APIs based on the intended function of those nodes. For example, a first standard could be established for data routing nodes and a second standard could established for nodes performing mapping and/or authentication functions. As another example, a routing API, a mapping API, and a validation API can be established, which can allow for the same device or hardware configuration to perform these functions. However, the use of keys, including secret keys by the validation node 1808 for authentication, can require storage of the keys in one or more HSMs, to promote key security and ensure that the keys are never entered into memory.

Figure 19:
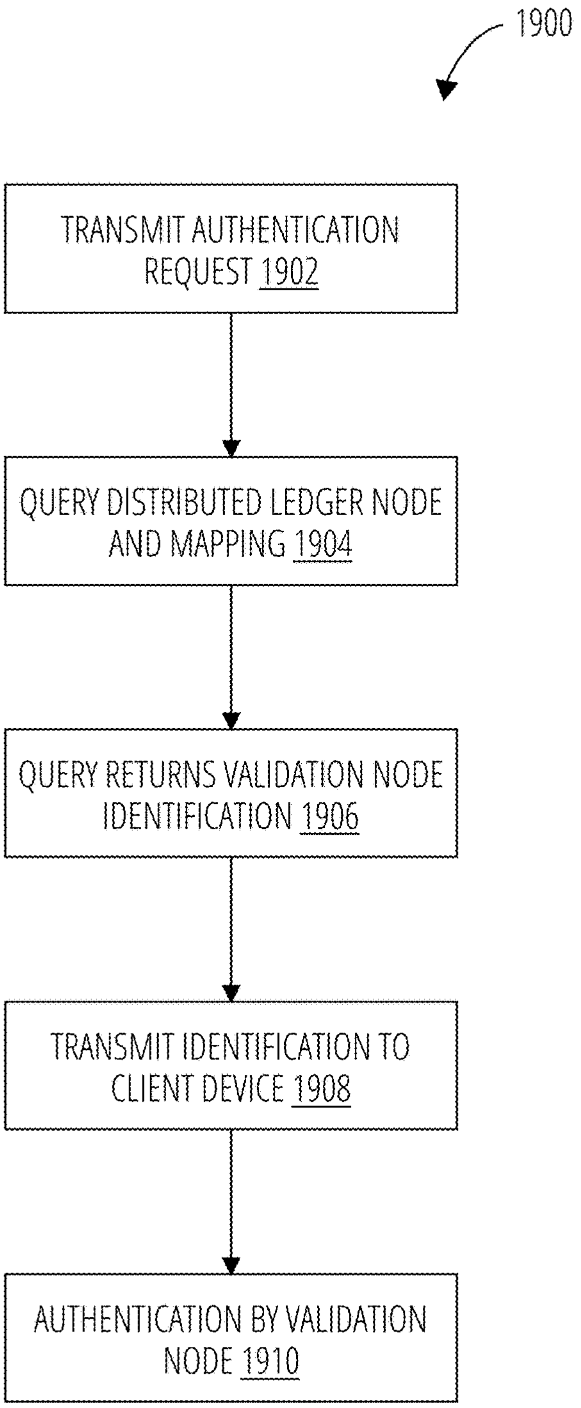
FIG. 19 illustrates an example of a method in accordance with one embodiment.

FIG. 19 illustrates a method 1900 performed by a distributed network authentication system according to an example embodiment. For example, the method can be performed by the distributed network authentication system 1800 and or by another distributed network authentication system.

In block 1902, a client device can transmit an authentication request to a client node. The authentication request can include, without limitation, a routing number, a software version number, and/or an applet version number. The request can be made by an API call or other communication between the client device and the client node.

In block 1904, after receiving the authentication request, the client node can transmit a query (e.g., via an API call) to a distributed ledger node. The distributed ledger node can contain a mapping, and the distributed ledger node can submit the query to the mapping.

In block 1906, the query can return an identification of a validation node and/or a validation node address, and the distributed ledger node can transmit this identification to the client node.

In block 1908, the client node can transmit the identification to the client device. After receiving the identification, the client device can proceed with authentication with the identified validation node and/or the identified validation node address, in block 1910.

Figure 20:
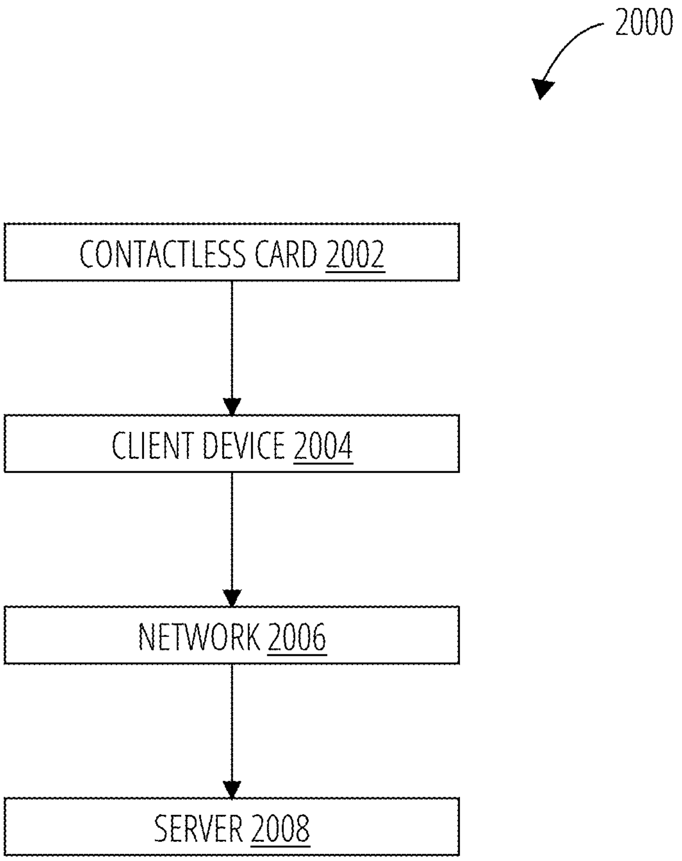
FIG. 20 illustrates an example of a system in accordance with one embodiment.

FIG. 20 illustrates a data transmission system 2000 according to an example embodiment. As further discussed below, the system 2000 may include a contactless card 2002, a client device 2004, a network 2006, and a server 2008. Although FIG. 20 illustrates single instances of the components, the system 2000 may include any number of components.

The system 2000 may include one or more contactless cards 2002, which are further explained below. In some embodiments, the contactless card 2002 may be in wireless communication, utilizing NFC in an example, with the client device 2004.

The system 2000 may include the client device 2004, which may be a network-enabled computer. As referred to herein, a network-enabled computer may include, but is not limited to a computer device or a communications device including, for example, a server, a network appliance, a personal computer, a workstation, a phone, a handheld PC, a personal digital assistant, a thin client, a fat client, an Internet browser, or other device. The client device 2004 also may be a mobile device; for example, a mobile device may include an iPhone, iPod, or iPad from Apple®, any other mobile device running Apple's iOS® operating system, any device running Microsoft's Windows® Mobile operating system, any device running Google's Android® operating system, and/or any other smartphone, tablet, or like wearable mobile device.

The client device 2004 can include a processor and a memory, and it is understood that processing circuitry may contain additional components, including processors, memories, error and parity/CRC checkers, data encoders, anticollision algorithms, controllers, command decoders, security primitives and tamperproofing hardware, as necessary, to perform the functions described herein. The client device 2004 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some examples, the client device 2004 may execute one or more applications, such as software applications that enable, for example, network communications with one or more components of the system 2000 and transmit and/or receive data.

The client device 2004 may be in communication with one or more server(s) 2008 via one or more network(s) 2006 and may operate as a respective front-end to back-end pair with the server 2008. The client device 2004 may transmit, for example, from a mobile device application executing on the client device 2004, one or more requests to the server 2008. The one or more requests may be associated with retrieving data from the server 2008. The server 2008 may receive the one or more requests from the client device 2004. Based on the one or more requests from the client device 2004, the server 2008 may be configured to retrieve the requested data from one or more databases (not shown). Based on receipt of the requested data from the one or more databases, the server 2008 may be configured to transmit the received data to the client device 2004, the received data being responsive to the one or more requests.

The system 2000 may include one or more networks 2006. In some examples, the network 2006 may be one or more of a wireless network, a wired network, or any combination of wireless network and wired network and may be configured to connect the client device 2004 to the server 2008. For example, the network 2006 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family of networking, Bluetooth, NFC, Radio Frequency Identification (RFID), Wi-Fi, and/or the like.

In addition, the network 2006 may include, without limitation, telephone lines, fiber optics, IEEE Ethernet 802.3, a wide area network, a wireless personal area network, a LAN, or a global network, such as the Internet. In addition, the network 2006 may support an Internet network, a wireless communication network, a cellular network, or the like, or any combination thereof. The network 2006 may further include one network or any number of the exemplary types of networks mentioned above, operating as a stand-alone network or in cooperation with each other. The network 2006 may utilize one or more protocols of one or more network elements to which the network 2006 is communicatively coupled. The network 2006 may translate to or from other protocols and to one or more protocols of network devices. Although the network 2006 is depicted as a single network, it should be appreciated that according to one or more examples, the network 2006 may comprise a plurality of interconnected networks, such as, for example, the Internet, a service provider's network, a cable television network, corporate networks, such as credit card association networks, and home networks.

The system 2000 may include one or more servers 2008. In some examples, the server 2008 may include one or more processors, which are coupled to memory. The server 2008 may be configured as a central system, server, or platform to control and call various data at different times to execute a plurality of workflow actions. The server 2008 may be configured to connect to the one or more databases. The server 2008 may be connected to at least one client device 2004.

Figure 21:
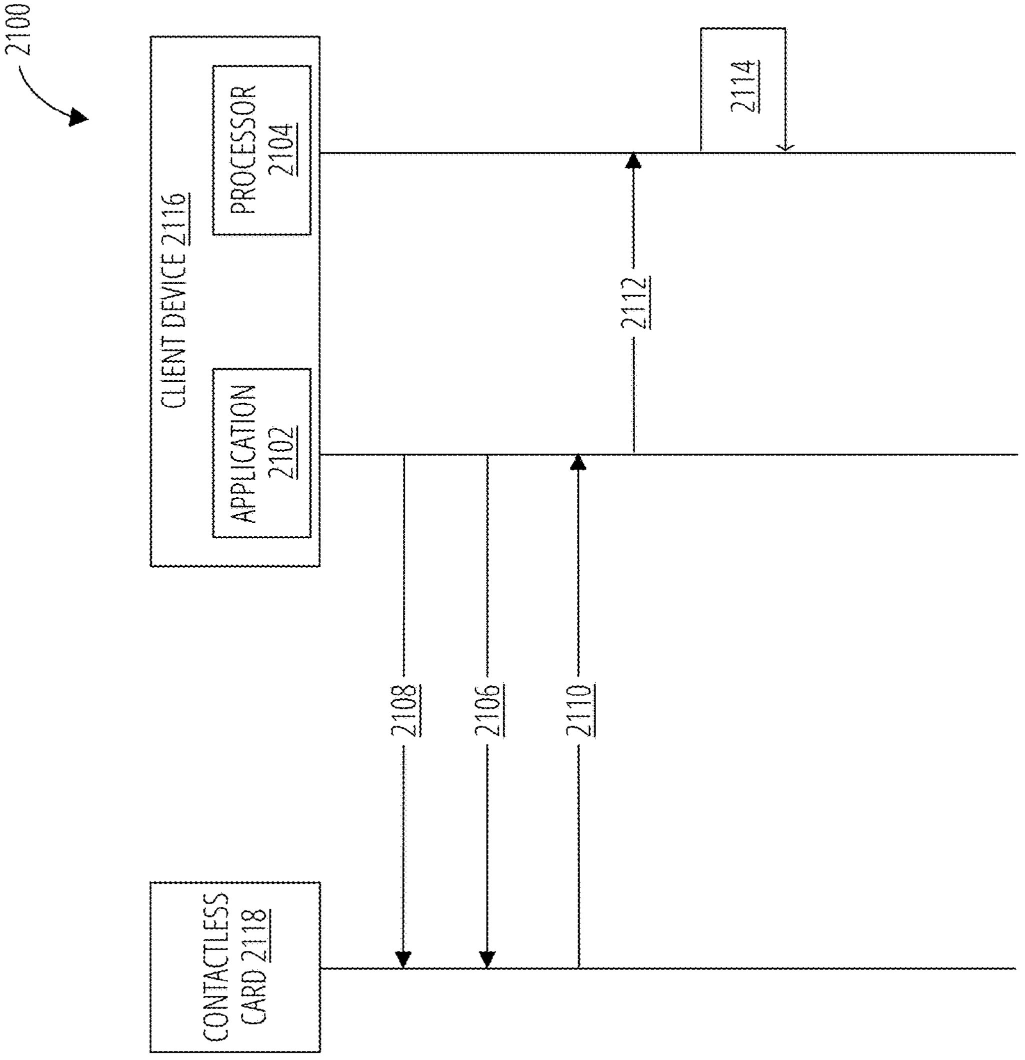
FIG. 21 illustrates an example of a sequence flow in accordance with one embodiment.

FIG. 21 is a timing diagram illustrating an example sequence flow 2100 for providing authenticated access according to one or more embodiments of the present disclosure. The sequence flow 2100 may include a contactless card 2118 and a client device 2116, which may include an application 2102 and a processor 2104.

At line 2108, the application 2102 communicates with the contactless card 2118 (e.g., after being brought near the contactless card 2118). Communication between the application 2102 and the contactless card 2118 may involve the contactless card 21182 being sufficiently close to a card reader (not shown) of the client device 2116 to enable NFC data transfer between the application 2102 and the contactless card 2118.

At line 2106, after communication has been established between the client device 2116 and the contactless card 2118, the contactless card 2118 generates a message authentication code (MAC) cryptogram. In some examples, this may occur when the contactless card 2118 is read by the application 2102. In particular, this may occur upon a read, such as an NFC read, of a NDEF tag, which may be created in accordance with the NFC Data Exchange Format. For example, a reader application, such as the application 2102, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 2118 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples, the MAC cryptogram may be included with a uniform resource indicator (e.g., as a formatted string). In some examples, the application 2102 may be configured to transmit a request to the contactless card 2118, the request comprising an instruction to generate a MAC cryptogram.

At line 2110, the contactless card 2118 sends the MAC cryptogram to the application 2102. In some examples, the transmission of the MAC cryptogram occurs via NFC. However, the present disclosure is not limited thereto. In other examples, this communication may occur via Bluetooth, Wi-Fi, or other means of wireless data communication. At line 2112, the application 2102 communicates the MAC cryptogram to the processor 2104.

At line 2114, the processor 2104 verifies the MAC cryptogram pursuant to an instruction from the application 2102. For example, the MAC cryptogram may be verified, as explained below. In some examples, verification of the MAC cryptogram may be performed by a device other than client device 2116, such as a server of a banking system in data communication with the client device 2116. For example, the processor 2104 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, for example, the Digital Signature Algorithm and the RSA algorithm or zero knowledge protocols, may be used to perform this verification.

As used in this application, the terms "system," "component" and "unit" are intended to refer to a computer-related entity, either hardware, a combination of hardware and software, software, or software in execution, examples of which are described herein. For example, a component may be, but is not limited to being, a process running on a processor, a processor, a hard disk drive, multiple storage drives, a non-transitory computer-readable medium (of either optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information may be implemented as signals allocated to various signal lines. In such allocations, each message may be a signal. Further embodiments, however, may alternatively employ data messages. Such data messages may be sent across various connections. Exemplary connections include parallel interfaces, serial interfaces, and bus interfaces.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method for dual factor authentication comprising:

receiving encrypted data from a contactless card within a communication range of a short-range communication antenna;

communicating the encrypted data to an authenticating device;

soliciting a user personal identification number (PIN) in response to authentication of the encrypted data by the authenticating device;

receiving an input PIN from the contactless card when the contactless card is within the communication range of the short-range communication antenna;

communicating the input PIN to the authenticating device, the authenticating device storing a record PIN for the contactless card; and authorizing a transaction request initiated in connection with the contactless card in response to matching of the input PIN with the record PIN by the authenticating device.

2. The method of claim 1 further comprising:

encrypting the input PIN for communication to the authenticating device.

3. The method of claim 1 wherein the input PIN includes an EMV PIN stored in an EMV applet on the contactless card.

4. The method of claim 3 further comprising:

receiving the EMV PIN from the EMV applet via a first applet on the contactless card in communication with the EMV applet.

5. The method of claim 4 further comprising:

receiving the encrypted data from the first applet.

6. The method of claim 3 further comprising:

authorizing the transaction request in response to matching of the EMV PIN with the record PIN by the authenticating device.

7. The method of claim 3 further comprising:

communicating with the EMV applet via a first applet on the contactless card, wherein the first applet acts as a communication bridge to the EMV applet.

8. A method for dual factor authentication comprising:

receiving encrypted data from a contactless card within a communication range of a short-range communication antenna;

communicating the encrypted data to an authenticating device;

soliciting a user personal identification number (PIN) in response to authentication of the encrypted data by the authenticating device;

receiving an input PIN from a user interface;

communicating the input PIN to the contactless card, the contactless card storing a record PIN; and authorizing a transaction request initiated in connection with the contactless card in response to matching of the input PIN with the record PIN by the contactless card.

9. The method of claim 8 further comprising:

communicating the input PIN to the contactless card responsive to the contactless card being within the communication range of a short-range communication antenna.

10. The method of claim 8 wherein the record PIN includes an EMV PIN stored in an EMV applet on the contactless card.

11. The method of claim 10 further comprising:

communicating the input PIN to the EMV applet via a first applet on the contactless card in communication with the EMV applet.

12. The method of claim 11 further comprising:

receiving the encrypted data from the first applet.

13. The method of claim 10 further comprising:

authorizing the transaction request in response to matching of the input PIN with the EMV PIN by the EMV applet.

14. The method of claim 13 further comprising:

receiving a matching notification from the EMV applet via a first applet on the contactless card in communication with the EMV applet.

15. The method of claim 10 further comprising:

communicating with the EMV applet via a first applet on the contactless card, wherein the first applet acts as a communication bridge to the EMV applet.

16. A mobile device comprising:

a processor; and a memory storing instructions that, when executed by the processor, cause the processor to:

receive encrypted data from a contactless card within a communication range of a short-range communication antenna;

communicate the encrypted data to an authenticating device;

solicit a user personal identification number (PIN) in response to authentication of the encrypted data by the authenticating device;

receive an input PIN;

communicate the input PIN to a separate device storing a record PIN for the contactless card; and authorize a transaction initiated in connection with the contactless card in response to matching of the input PIN with the record PIN by the separate device.

17. The mobile device of claim 16 wherein the input PIN is received from the contactless card when the contactless card is within the communication range of the short-range communication antenna, and wherein the separate device includes the authenticating device.

18. The mobile device of claim 17 wherein the input PIN includes an EMV PIN stored in an EMV applet on the contactless card, and wherein the EMV PIN is received from the EMV applet via a first applet on the contactless card in communication with the EMV applet.

19. The mobile device of claim 16 wherein the input PIN is received from a user interface, wherein the separate device includes the contactless card, and wherein the input PIN is communicated to the contactless card responsive to the contactless card being within the communication range of a short-range communication antenna.

20. The mobile device of claim 19 wherein the record PIN includes an EMV PIN stored in an EMV applet on the contactless card, and wherein the input PIN is communicated to the EMV applet via a first applet on the contactless card in communication with the EMV applet.

* * * * *